United States Patent
Ayaki et al.

(10) Patent No.: US 8,073,207 B2
(45) Date of Patent: Dec. 6, 2011

(54) METHOD FOR DISPLAYING FACE DETECTION FRAME, METHOD FOR DISPLAYING CHARACTER INFORMATION, AND IMAGE-TAKING DEVICE

(75) Inventors: Kenichiro Ayaki, Asaka (JP); Tomoyuki Mizuta, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1246 days.

(21) Appl. No.: 11/797,791

(22) Filed: May 8, 2007

(65) Prior Publication Data
US 2007/0266312 A1   Nov. 15, 2007

(30) Foreign Application Priority Data
May 12, 2006   (JP) .................................. 2006-134300

(51) Int. Cl.
*G06K 9/00* (2006.01)
*H04N 5/74* (2006.01)
*H05G 1/64* (2006.01)

(52) U.S. Cl. .................. 382/118; 382/189; 348/E5.138; 378/98

(58) Field of Classification Search .................. 382/100, 382/141, 145, 118, 147, 181, 190, 195, 205, 382/172, 168, 189; 396/114, 111; 378/91, 378/98, 98.2, 98.7; 250/200, 201.1, 201.2, 250/201.3; 348/E5.001, E5.085, E5.086, 348/E5.09, E5.138; 428/913, 914, 327, 423.1, 428/447; 375/E7.193; 503/227; 606/130; 400/708; 356/614, 623
See application file for complete search history.

(56) References Cited

U.S. PATENT DOCUMENTS

| | | | |
|---|---|---|---|
| 5,835,641 A | 11/1998 | Sotoda et al. | |
| 2005/0219395 A1 | 10/2005 | Sugimoto | |

FOREIGN PATENT DOCUMENTS

| | | |
|---|---|---|
| CN | 1678032 A | 10/2005 |
| DE | 103 21 501 A1 | 12/2004 |
| JP | 04-020941 A | 1/1992 |
| JP | 2004-282535 A | 10/2004 |
| JP | 2005-284203 A | 10/2005 |
| JP | 2005-286940 A | 10/2005 |
| JP | 2006-005662 A | 1/2006 |
| JP | 2006-041645 A | 2/2006 |

OTHER PUBLICATIONS

JP Notice of Reasons for Rejection, dated Oct. 22, 2009, issued in corresponding JP Application No. 2006-134300, 4 pages English and Japanese.
CN Notification of First Office Action, issued Sep. 19, 2008, in corresponding CN Application No. 200710102933.1, 13 pages English and Chinese.
EP Communication, dated May 26, 2010, issued in corresponding European Application No. 07251914.3, 6 pages.

*Primary Examiner* — Sheela Chawan
(74) *Attorney, Agent, or Firm* — Sughrue Mion, PLLC

(57) ABSTRACT

An aspect of the present invention provides a method for displaying a face detection frame in an image-taking device, which obtains an image signal representing a subject continuously at a predetermined cycle, displays a live video preview on a display device based on the obtained image signal and detects a face of the subject included in the live preview based on the obtained image signal, and superimposes a face detection frame surrounding the detected face of the subject on the live preview for display on the display device, wherein the movement of the image-taking device from the time of obtaining the image used for the face detection is detected, and wherein the display position of the face detection frame is corrected according to the detected movement of the image-taking device on the basis of the display position of the face detection frame relative to the image used for the face detection.

20 Claims, 21 Drawing Sheets

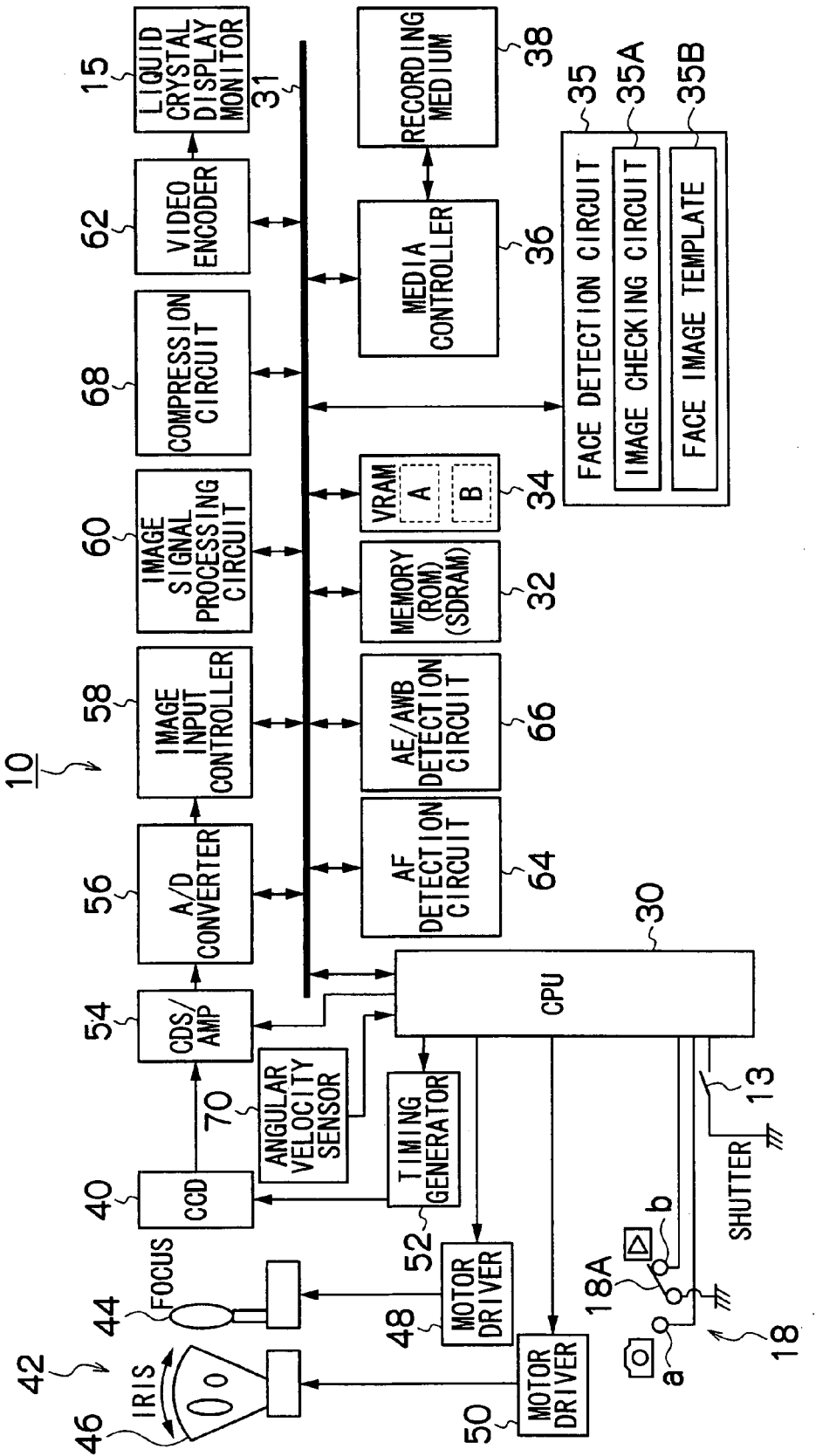

PAN TO THE RIGHT

ORIGINAL LIVE PREVIEW

TILT DOWNWARD

FIG.14

| NAME | FEATURE A | FEATURE B | ... |
|------|-----------|-----------|-----|
| Tony | 52.5 | 17.6 | |
| Maria | 47.3 | 19.2 | |

ORIGINAL LIVE PREVIEW

PAN TO THE RIGHT

TILT DOWNWARD

ORIGINAL LIVE PREVIEW

PAN TO THE RIGHT

TILT DOWNWARD

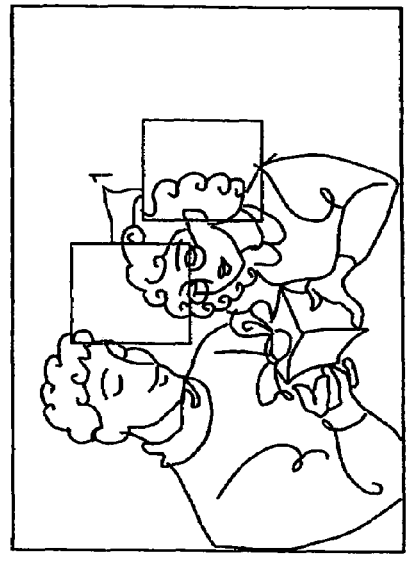
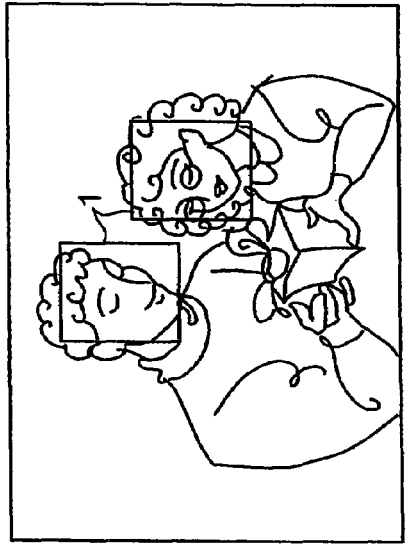
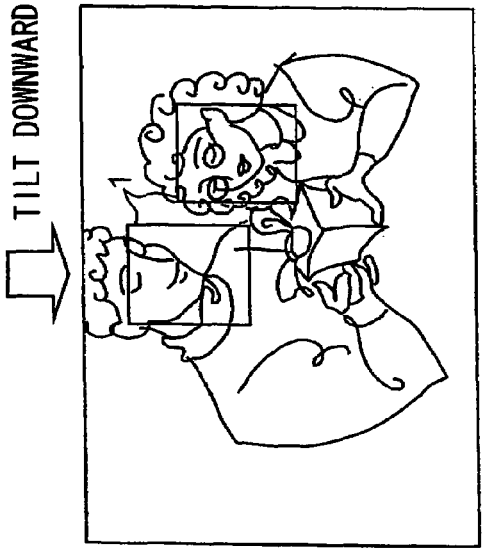

METHOD FOR DISPLAYING FACE DETECTION FRAME, METHOD FOR DISPLAYING CHARACTER INFORMATION, AND IMAGE-TAKING DEVICE

BACKGROUND OF THE INVENTION

1. Field of the Invention

The present invention relates to a method for displaying a face detection frame, a method for displaying character information, and an image-taking device, and more particularly to technology for fitting the position of the face detection frame or the like onto a live preview.

2. Description of the Related Art

Digital cameras which can detect a face from a subject have become commercially practical. These cameras can capture an image of a subject with proper focus and exposure by detecting a face and performing automatic focus control (AF) and automatic exposure control (AE) in the face area, even if the AF and AE based on the normal imaging are difficult. In addition, such a digital camera can display a face detection frame in the detection area when it detects a face so that an operator can determine whether or not the digital camera has detected a face.

Japanese Patent Application Laid-Open No. 2005-286940 discloses a digital camera which detects a face area present in a subject image obtained by imaging and enables the user to know the face area when he/she picks up the image. Further, AF and AE are performed using image data representing the image within the face detection frame. This enables the image data representing the subject image to be recorded with the face area being in focus and at an appropriate brightness.

Japanese Patent Application Laid-Open No. 2005-284203 discloses a digital camera having a lens control device which detects a face area present in a subject image obtained by imaging and controls a lens driving circuit to position a lens in a position where the face evaluation value is maximal.

SUMMARY OF THE INVENTION

If a face detection frame is displayed on a live preview which is being continuously picked up and displayed, however, since it takes a few seconds for one face detection, there is a problem that the position of the face on the live preview and the face detection frame become misaligned when the camera is panned/tilted.

FIG. 21A shows an original live preview with a face detection frame 1 which is displayed when the camera is not moved. As shown in FIG. 21A, when the camera is not moved, the face detection frame 1 is displayed in a position which indicates (surrounds) the face image displayed on the live preview.

On the other hand, when the camera is panned to the right during the time from one face detection to the next, the live preview moves to the left relative to the stationary face detection frame 1, and the position of the face on the live preview and the position of the face detection frame 1 become misaligned (FIG. 21B), and similarly, when the camera is tilted downward, the live preview moves upward relative to the stationary face detection frame 1, and the position of the face on the live preview and the position of the face detection frame 1 become misaligned (FIG. 21C).

The above described problem may be solved by synchronizing the update cycle of the live preview with the face detection cycle, but in this case, the user cannot be quickly aware of the live preview, and thus will have difficulty in determining the composition.

The present invention has been made in consideration of the above situation, and its object is to provide a method for displaying a face detection frame, a method for displaying character information, and an image-taking device which allow for matching the positions of a face on a live preview and a face detection frame as well as maintaining a fixed alignment between a character image in the live preview and character information representing the characters in the character image, even if the update cycle of the live preview is fast.

To achieve the above-described object, according to a first aspect of the present invention, there is provided a method for displaying a face detection frame in an image-taking device, which obtains an image signal representing a subject continuously at a predetermined cycle, displays a live video preview on a display device based on the obtained image signal and detects a face of the subject included in the live preview based on the obtained image signal, and superimposes a face detection frame surrounding the detected face of the subject on the live preview for display on the display device, wherein a movement of the image-taking device from the time of obtaining the image used for the face detection is detected and a display position of the face detection frame is corrected according to the detected movement of the image-taking device on a basis of the display position of the face detection frame relative to the image used for the face detection.

In other words, because the display position of the face detection frame is adapted to be corrected according to the movement of the image-taking device from the time of obtaining the image used for the face detection, the position of the face on the live preview and the position of the face detection frame can be matched even if the image-taking device is panned/tilted.

According to a second aspect of the present invention, in the display method of the face detection frame as defined in the first aspect, the movement of the image-taking device is detected based on a detection output of an angular velocity sensor which detects angular velocity of the image-taking device.

According to a third aspect of the present invention, in the display method of the face detection frame as defined in the first aspect, the movement of the image-taking device is detected by detecting the motion vector of the image based on the image signal continuously obtained from the image-taking device.

According to a fourth aspect of the present invention, in the display method of the face detection frame as defined in the second aspect, a focal length of a taking lens is detected when the image of the subject is picked up, and the frame display position is corrected based on the detection output of the angular velocity sensor and the detected focal length. Since the amount of movement of the live preview when the camera is panned/tilted depends on the focal length of the taking lens, the display position of the face detection frame is corrected in such a manner that the focal length of the taking lens is also taken into account in addition to the amount of change in pan/tilt detected by the angular velocity sensor.

According to a fifth aspect of the present invention, in the display method of the face detection frame as defined in any of the first to fourth aspects, a camera shake of the image is compensated in accordance with the detected movement of the image-taking device, and the display position of the face detection frame is corrected in accordance with the movement of the image-taking device which cannot be corrected by the camera shake compensation.

This enables the face detection frame to be moved solely based on the movement of the image-taking device (pan/tilt)

which cannot be compensated by the camera shake compensation, and to be fixed relative to the position of the face on the live preview.

According to a sixth aspect of the present invention, in the display method of the face detection frame as defined in any of the first to fifth aspects, a person is identified from features of the face of the subject included in the live preview based on the obtained image signal, the name of the identified person is superimposed on the live preview so as to correspond to the position of the person for display, and the display position of the person's name is corrected in accordance with the movement of the detected image-taking device.

As a result, the person's name identified from the features of the face of the subject can be superimposed on the live preview so as to correspond to the position of the person for display, and its display position can also be corrected in accordance with the movement of the image-taking device.

According to a seventh aspect of the present invention, there is provided a method for displaying character information in an image-taking device, which obtains an image signal representing a subject continuously at a predetermined cycle, displays a live video preview on a display device based on the obtained image signal and detects a character image included in the live preview based on the obtained image signal, and superimposes character information representing the characters in the detected character image or translation thereof for display in the vicinity of the character image on the live preview, wherein a movement of the image-taking device from the time of obtaining the image used for the character detection is detected and a display position of the character information is corrected according to the detected movement of the image-taking device on a basis of the display position of the character information relative to the image used for the character detection.

Since the method allows for detecting a character image included in the live preview and superimposing character information representing the characters in the detected character image or translation thereof for display in the vicinity of the character image on the live preview, and in particular, the method allows for correcting the display position of the character information in accordance with the movement of the image-taking device from the time of obtaining the image used for the character detection, the position of the character image on the live preview can be fixed relative to the position of the character information even if the image-taking device is panned/tilted.

According to an eighth aspect of the present invention, in the display method of the character information as defined in the seventh aspect, the movement of the image-taking device is detected based on a detection output of an angular velocity sensor which detects angular velocity of the image-taking device.

According to a ninth aspect of the present invention, in the display method of the character information as defined in the seventh aspect, the movement of the image-taking device is detected by detecting a motion vector of the image based on the image signal continuously obtained from the image-taking device.

According to a tenth aspect of the present invention, in the display method of the character information as defined in the eighth aspect, a focal length of a taking lens is detected when the image of the subject is picked up, and the display position of the character information is corrected based on the detection output of the angular velocity sensor and the detected focal length.

According to an eleventh aspect of the present invention, in the display method of the character information as defined in any of the seventh to tenth aspects, a camera shake of the image is compensated in accordance with the detected movement of the image-taking device, and the display position of the character information is corrected in accordance with the movement of the image-taking device which cannot be compensated by the camera shake compensation.

According to a twelfth aspect of the present invention, there is provided an image-taking device comprising: an image pickup device which picks up an image of a subject; an image obtaining device which obtains an image signal representing the subject through the image pickup device continuously at a predetermined cycle; a display device which displays a live video preview based on the obtained image signal; a face detection device which detects a face of the subject included in the live preview based on the obtained image signal, wherein the face detection device takes a longer time from the input of the image signal for face detection to the completion of the face detection than the cycle of the continuously obtained image signal; a face detection frame display control device which superimposes a face detection frame surrounding the detected face of the subject on the live preview for display; a movement detection device which detects a movement of the image-taking device; and a frame display position correction device which corrects a display position of the face detection frame displayed on the display device based on a detection output of the movement detection device until the face detection device completes the next face detection.

According to a thirteenth aspect of the present invention, in the image-taking device as defined in the twelfth aspect, the movement detection device includes an angular velocity sensor which detects angular velocity of the image-taking device.

According to a fourteenth aspect of the present invention, in the image-taking device as defined in the twelfth aspect, the movement detection device is a motion vector detection device which detects a motion vector of the image based on the continuously obtained image signal.

According to a fifteenth aspect of the present invention, the image-taking device as defined in the thirteenth aspect further comprises a detection device which detects a focal length of a taking lens when the image of the subject is picked up, wherein the frame display position correction device corrects the display position of the face detection frame displayed on the display device based on the detection output of the angular velocity sensor and the detected focal length.

According to a sixteenth aspect of the present invention, the image-taking device as defined in any of the twelfth to fifteenth aspects further comprises a camera shake compensation device which detects camera shake and corrects the blur of the image based on the detection output of the movement detection device, wherein the frame display position correction device detects a pan/tilt angle after the camera shake compensation based on the detection output of the movement detection device, and corrects the display position of the face detection frame displayed on the display device based on the pan/tilt angle.

According to a seventeenth aspect of the present invention, the image-taking device as defined in any of the twelfth to sixteenth aspects further comprises: a person identification device which identifies a person from features of the face of the subject included in the live preview based on the obtained image signal, a name display control device which superimposes the name of the identified person on the live preview so as to correspond to the position of the person for display, and a name display position correction device which corrects the display position of the name of the person displayed on the display device based on the detection output of the movement detection device until the person identification device completes the next person identification.

According to an eighteenth aspect of the present invention, there is provided an image-taking device comprising: an image pickup device which picks up an image of a subject; an image obtaining device which obtains an image signal representing the subject through the image pickup device continuously at a predetermined cycle; a display device which displays a live preview based on the obtained image signal; a character detection device which detects characters indicated by in a character image included in the live preview based on the obtained image signal, wherein the character detection device takes a longer time from the input of the image signal for character detection to the completion of the character detection than the cycle of the continuously obtained image signal; a character display control device which superimposes character information representing the detected characters or translation thereof for display in the vicinity of the character image on the live preview; a movement detection device which detects the movement of the image-taking device; and a character display position correction device which corrects the display position of the character information displayed on the display device based on the detection output of the movement detection device until the character detection device completes the next character detection.

According to a nineteenth aspect of the present invention, in the image-taking device as defined in the eighteenth aspect, the movement detection device includes an angular velocity sensor which detects angular velocity of the image-taking device.

According to a twentieth aspect of the present invention, in the image-taking device as defined in the eighteenth aspect, the movement detection device is a motion vector detection device which detects a motion vector of the image based on the continuously obtained image signal.

According to a twenty-first aspect of the present invention, the image-taking device as defined in the nineteenth aspect further comprises a detection device which detects the focal length of a taking lens when the image of the subject is picked up, wherein the character display position correction device corrects the display position of the character information displayed on the display device based on the detection output of the angular velocity sensor and the detected focal length.

According to a twenty-second aspect of the present invention, the image-taking device as defined in any of the eighteenth to twenty-first aspects further comprises a camera shake compensation device which detects camera shake and corrects the blur of the image based on the detection output of the movement detection device, wherein the character display position correction device detects a pan/tilt angle after the camera shake compensation based on the detection output of the movement detection device and corrects the display position of the character information displayed on the display device based on the pan/tilt angle.

According to the present invention, since the display position of the face detection frame is adapted to be corrected in accordance with the movement of the image-taking device from the time of obtaining the image used for the face detection in the live preview even if the update cycle of the live preview is fast, the position of the face on the live preview can be fixed relative to the position of the face detection frame even when the image-taking device is panned/tilted. Similarly, since character information representing the characters or translation thereof included in the live preview can be superimposed for display in the vicinity of the characters on the live preview, and in particular, the display position of the character information is adapted to be corrected in accordance with the movement of the image-taking device from the time of obtaining the image used for the character detection, the position of the characters on the live preview can be fixed relative to the position of the character information even when the image-taking device is panned/tilted.

BRIEF DESCRIPTION OF THE DRAWINGS

FIG. 2 is a block diagram illustrating an exemplary internal structure of a first embodiment of the digital camera shown in FIG. 1;

FIG. 14 is a diagram used to illustrate a personal features database;

FIGS. 21A, 21B and 21C are pictures used to illustrate a method for displaying a face detection frame in the prior art.

DETAILED DESCRIPTION OF THE PREFERRED EMBODIMENTS

Preferred embodiments of a method for displaying a face detection frame, a method for displaying character information, and an image-taking device according to the present invention will now be described with reference to the accompanying drawings below.

[Appearance of Image-Taking Device According to the Invention]

Figure 1:
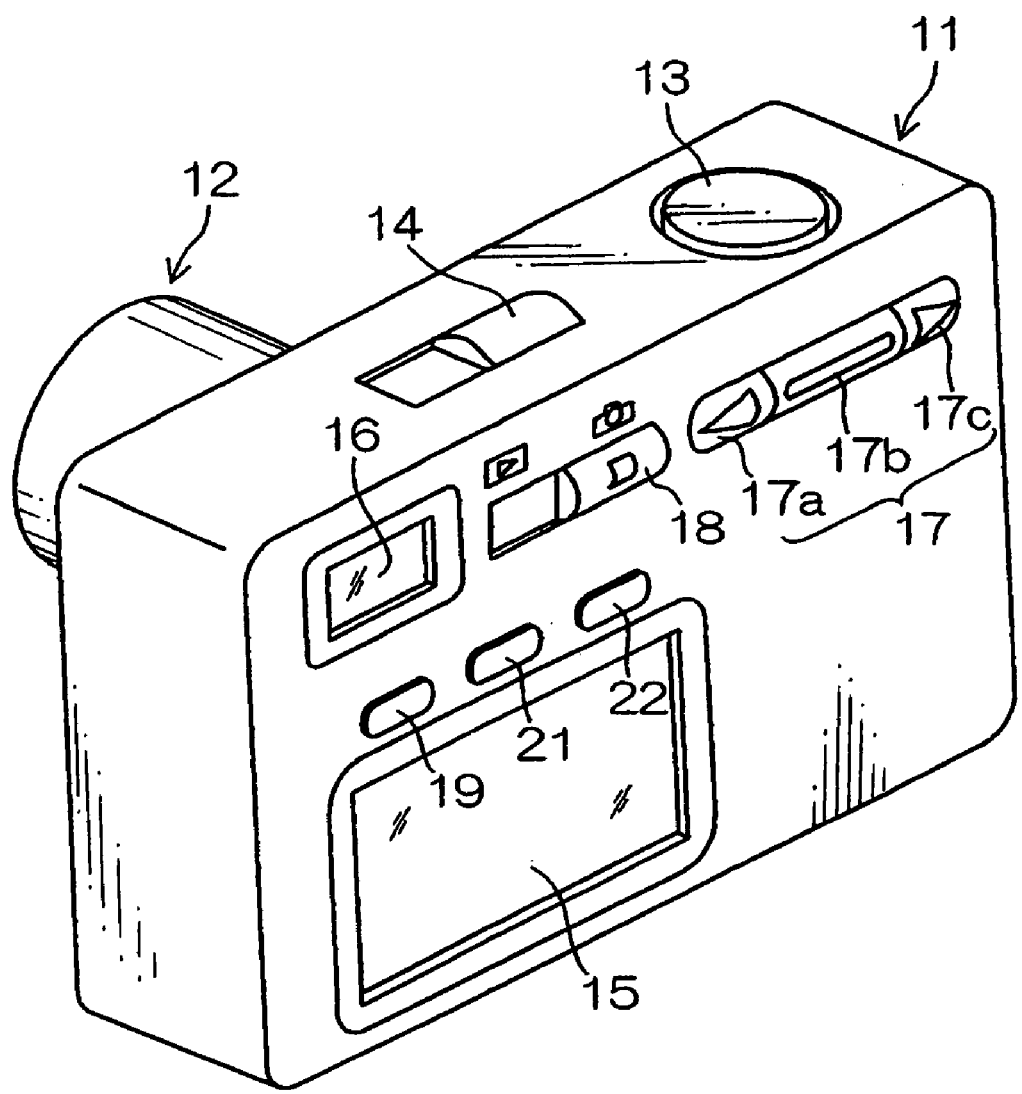
FIG. 1 is a perspective view from the back of an image-taking device according to the present invention.

FIG. 1 is a perspective view from the back of an image-taking device (digital camera) according to the present invention, with its camera cone 12 being reeled out of a camera enclosure 11.

This digital camera 10 is capable of recording and playing back still pictures and moving pictures, and especially has a face detection function as well as a function of displaying a face detection frame on a live preview. A shutter button 13 and a power switch 14 are provided on the top surface of the camera enclosure 11. The shutter button 13 has a switch S1 which is turned on to make preparations for shooting, such as focus lock, photometry, etc., when it is half-pressed, and a switch S2 which is turned on to capture an image when it is fully pressed.

Provided on the backside of the camera enclosure 11 are an liquid crystal display monitor 15, an eyepiece of an optical viewfinder 16, right and left keys 17a, 17c, and an up-and-down key 17b for multifunction, a mode switch 18 to select shooting mode or playback mode, a display button 19 to enable/disable the liquid crystal display monitor 15, a cancel/return button 21, and a menu/execute button 22.

The liquid crystal display monitor 15 can display a moving picture (live preview) to be used as an electronic viewfinder and can also display a playback image read out from a memory card loaded in the camera. Also, the liquid crystal display monitor 15 provides various types of menu screens according to the operation of the menu/execute button 22 for manually setting the operational mode of the camera, white balance, the number of pixels, sensitivity, etc. of the image, and also provides a screen for a graphical user interface (GUI) which allows for manually setting preferences by using the right and left keys 17a, 17c, up-and-down key 17b, and menu/execute button 22. Further, the liquid crystal display monitor 15 displays a face detection frame as discussed later.

First Embodiment

FIG. 2 is a block diagram illustrating an exemplary internal structure of a first embodiment of the digital camera 10 shown in FIG. 1.

The overall operation of the digital camera 10 is governed by a central processing unit (CPU) 30. The CPU 30 acts as a control device which controls this camera system according to a predetermined program, and also acts as a computing device which performs various types of operations such as automatic exposure (AE) operations, automatic focus (AF) operations, or white balance (WB) adjustment operations.

A memory 32, being connected with the CPU 30 via a bus 31, includes a ROM which stores programs executed by the CPU 30 and various types of data needed for controls, and an SDRAM which is used as a deployment area for the programs and a working area for computation by the CPU 30 as well as a temporary storage area for image data. A VRAM 34 is a temporary memory exclusively used for image data and includes areas A and B which image data is alternately read from and written to.

The digital camera 10 is provided with an operating unit including the shutter button 13, the mode switch 18, and others as described above, signals from the operating unit are input to the CPU 30, and the CPU 30 controls the respective circuits of the digital camera 10 based on the input signals to perform, for example, lens driving control, shooting operation control, image processing control, image data recording/playback control, display control of the liquid crystal display monitor 15, and so on.

If the mode switch 18 is operated to cause a movable contact 18A to connect to a contact a, its signal is input to the CPU 30 to set to the shooting mode, and if the mode switch 18 is operated to cause the movable contact 18A to connect to a contact b, the digital camera is set to the playback mode for playing back a recorded image.

A media controller 36 exchanges signals required for passing input/output signals suitable for a recording medium 38 inserted in the media socket.

This digital camera 10 is also provided with an angular velocity sensor 70 used for detecting the movement of the camera while the live preview is being displayed. The detected signal from the angular velocity sensor 70 which indicates angular velocity in the right-and-left/up-and-down (pan/tilt) direction is output to the CPU 30.

A face detection circuit 35 includes an image checking circuit 35A and a face image template 35B, and detects the face of a subject (person) included in the live preview and outputs information about the position and size of the face to the CPU 30.

More specifically, the image checking circuit 35A of the face detection circuit 35 compares an image within a target area against the face image template 35B to examine the correlation between them while shifting the position of the target area within the image plane of the live preview. Then, if the correlation score exceeds a preset threshold, the target area is identified as a face area. Other well known methods for face detection may also be used, including face detection methods by edge detection or shape pattern detection, by hue detection or flesh color detection.

The CPU 30 can operate, upon receipt of the information indicating the position and size of the face area from the face detection circuit 35, to cause a face detection frame surrounding the obtained face area of a person to be superimposed on the live preview for display on the liquid crystal display monitor 15.

The CPU 30 also operates to detect, based on the detection signal incoming from the angular velocity sensor 70, the amount of change (angle) in the pan/tilt direction of the digital camera 10 from the time of obtaining the image (frame image) used for face detection to the time of obtaining the live preview currently displayed on the liquid crystal display monitor 15 (real-time image), and to correct the display position of the face detection frame according to the detected amount of change, on the basis of the display position of the face detection frame relative to the image used for the face detection. Note that the display method of the face detection frame will be discussed in detail below.

Next, the imaging function of the digital camera 10 will be described.

When the shooting mode is selected by the mode switch 18, power is supplied to an imaging unit which includes a color CCD image sensor (hereinafter referred to as "CCD") 40, and is made ready for shooting.

A lens unit 42 is an optical unit which includes a taking lens 44 including a focus lens and a mechanical shutter/aperture 46. The lens unit 42 is electrically driven by motor drivers 48, 50 controlled by the CPU 30 to perform zoom control, focus control and iris control.

Light passing through the lens unit 42 forms an image on the light receiving surface of the CCD 40. On the light receiving surface of the CCD 40, a lot of photodiodes (light receiving elements) are arranged in a two-dimensional array, and primary color filters of red (R), green (G) and blue (B) are disposed in a predetermined array structure (Bayer system, G-stripe, etc.) corresponding to each of the photodiodes. In addition, the CCD 40 has an electronic shutter function of controlling the charge storage time of each of the photodiodes (shutter speed). The CPU 30 controls the charge storage time at the CCD 40 through a timing generator 52.

The image of a subject formed on the light receiving surface of the CCD 40 is converted into a signal electric charge of an amount corresponding to the amount of the incident light by each of the photodiodes. The signal electric charge accumulated in each of the photodiodes is read out sequentially as a voltage signal (image signal) corresponding to the signal electric charge based on a driving pulse given by the timing generator 52 under the direction of the CPU 30.

The signal output from the CCD 40 is sent to an analog processing unit (CDS/AMP) 54, where R, G, and B signals for each pixel are sampled-and-held (correlated double sampling), amplified, and then added to an A/D converter 56. The dot sequential R, G, and B signals converted into digital signals by the A/D converter 56 are stored in the memory 32 via a controller 58.

An image signal processing circuit 60 processes the R, G, and B signals stored in the memory 32 under the direction of the CPU 30. In other words, the image signal processing circuit 60 functions as an image processing device including a synchronization circuit (a processing circuit which interpolates spatial displacement of color signals involved in the color filter array of a single chip CCD and synchronously converts color signals), a white balance correction circuit, a gamma correction circuit, an edge correction circuit, luminance/color-difference signal generation circuit, etc., and performs predetermined signal processings according to the commands from the CPU 30 using the memory 32.

The RGB image data input to the image signal processing circuit 60 is converted to a luminance signal (Y signal) and a color-difference signal (Cr, Cb signal), and undergoes predetermined processings such as gamma correction at the image signal processing circuit 60. The image data processed at the image signal processing circuit 60 is stored in the VRAM 34.

If a picked-up image is displayed on the liquid crystal display monitor 15, the image data is read out from the VRAM 34 and sent to a video encoder 62 via the bus 31. The video encoder 62 converts the input image data into a signal in a predetermined system (e.g. a composite color video signal in the NTSC system) to output to an image display device 28.

Image data representing an image for one frame is updated alternately in the area A and the Area B by the image signal output from the CCD 40. The written image data is read out from one of the areas A and B in the VRAM 34, in which the image data is being updated. In this manner, the video being captured is displayed on the liquid crystal display monitor 15 in real time by updating the image data within the VRAM 34 on a regular basis and providing the video signal generated from the image data to the liquid crystal display monitor 15. The user who is shooting the video can check the shooting angle of view by using the video (live preview) displayed on the liquid crystal display monitor 15.

When the shutter button 13 is halfway pressed to turned S1 on, the digital camera 10 starts AE and AF processing. In other words, the image signal output from the CCD 40 is input via the image input controller 58 to an AF detection circuit 64 and an AE/AWB detection circuit 66 after undergoing the A/D conversion.

The AE/AWB detection circuit 66 includes a circuit which divides an image plane into multiple (e.g. 16×16) areas and integrates RGB signals for each of the divided areas, and provides the integration values to the CPU 30. The CPU 30 detects the brightness of the subject (subject luminance) and calculates an exposure value (EV) suitable for shooting based on the integration values obtained from the AE/AWB detection circuit 66. An aperture value and shutter speed is determined based on the calculated exposure value and a predetermined exposure program chart, and the CPU 30 controls the electronic shutter and the iris to obtain appropriate light exposure according to this.

Also, during automatic white balance adjustment, the AE/AWB detection circuit 66 calculates average integration values of the RGB signals by color for each divided area and provides the results to the CPU 30. The CPU 30, upon receipt of the integration values for R, B and G, determines the ratios of R/G and B/G for each divided area, performs light source type discrimination based on, for example, the distribution of the values for R/G and B/G in the R/G and B/G color spaces, and controls the gain values (white balance correction values) of the white balance adjustment circuit for the R, G, and B signals and corrects the signal for each channel, for example, in such a manner that the value for each ratio will be approximately one (1) (i.e., the ratio of the RGB integration values for a image plane will be R:G:B≈1:1:1) according to the white balance adjustment value suitable for the discriminated light source type.

The AF control of this digital camera 10 employs contrast AF which moves a focusing lens (a movable lens which contributes to focus adjustment, of the lens optical system constituting the taking lens 44), for example, so as to maximize high frequency component of the G signal of the video signal. Thus, the AF detection circuit 64 consists of a high-pass filter which allows only the high frequency component of the G signal to pass through, an absolute value processing unit, an AF area extraction unit which cuts out a signal in a focus target area preset within the image plane (e.g. at the center of the image plane), and an integration unit which integrates the absolute value data within the AF area.

The data of the integration values determined in the AF detection circuit 64 is notified to the CPU 30. The CPU 30 calculates a focus evaluation value (AF evaluation values) at a plurality of AF detection points while controlling the motor driver 48 to shift the focusing lens, and determines a lens position where the evaluation value is maximal as a in-focus position. Then, the CPU 30 controls the motor driver 48 to move the focusing lens to the determined in-focus position.

The shutter button 13 is half-pressed to turn on S1 to perform the AE/AF processing, and then the shutter button 13 is fully pressed to turn on S2 to start the shooting operation for recording. The image data obtained in response to the S2 ON operation is converted into luminance/color-difference signals (Y/C signals) at the image signal processing circuit 60 and is stored in the memory 32 after undergoing the predetermined processings such as gamma correction.

The Y/C signals stored in the memory 32 are recorded through the media controller 36 onto the recording medium 38 after being compressed by a compression circuit 68 according to a predetermined format. For example, a static image is recorded in a JPEG (Joint Photographic Experts Group) format.

When the playback mode is selected by the mode switch 18, the compressed data of the latest image file (last recorded file) recorded in the recording medium 38 is read out. If the file for the last record is a static image file, the read out image compression data is decompressed via the compression circuit 68 to decompressed Y/C signals, and is output to the liquid crystal display monitor 15 after being converted via the image signal processing circuit 60 and the video encoder 62 into signals for display. As a result, the image content of the file is displayed on the screen of the liquid crystal display monitor 15.

The file to be played back can be switched (forward/backward step) by operating the right key 17c or the left key 17a while one frame of a still picture (including the top frame of a moving picture) is being played. The image file at the position resulting form the stepping is read out from the recording medium 38 and the still picture or the moving picture is played back on the liquid crystal display monitor 15 in a manner similar to the above.

Next, a first embodiment of a method for displaying a face detection frame according to the present invention will be described.

First, the outline of the method for displaying a face detection frame according to the present invention will be described in FIGS. 3A to 3C.

Figure 3B:
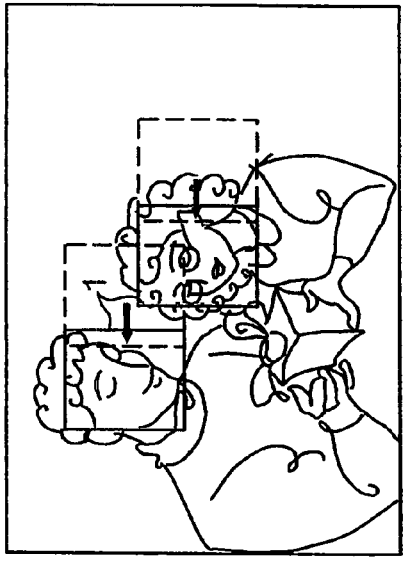
FIGS. 3A, 3B and 3C are pictures used to illustrate the outline of a method for displaying a face detection frame according to the present invention.
Figure 3A:
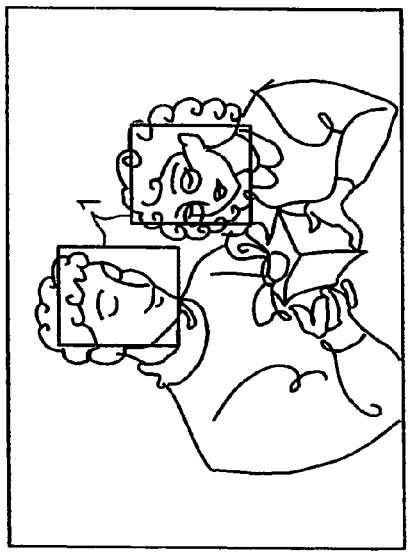

FIG. 3A shows an original live preview at the time of face detection with face detection frames 1 which are displayed when the camera is not moved.

As shown in FIG. 3A, if the camera is not moved from the time of the face detection, since the live preview does not also move, the positions of the faces on the live preview match the positions of the face detection frames 1 which are displayed at the time of the face detection so as to surround the faces.

On the other hand, if the camera is panned during the time from one face detection to the next as shown in FIG. 3B, the live preview at the time of the face detection (the original live preview) is moved to the left.

Figure 3C:

Likewise, if the camera is tilted downward during the time from one face detection to the next as shown in FIG. 3C, the original live preview moves upward.

The present invention detects the amount of movement of the current live preview with respect to the original live preview, and moves the face detection frames 1 in accordance with the amount of movement, and this results in the positions of the faces on the live preview being fixed relative to the positions of the face detection frames 1 even if the digital camera 10 is panned/tilted.

Figure 4:
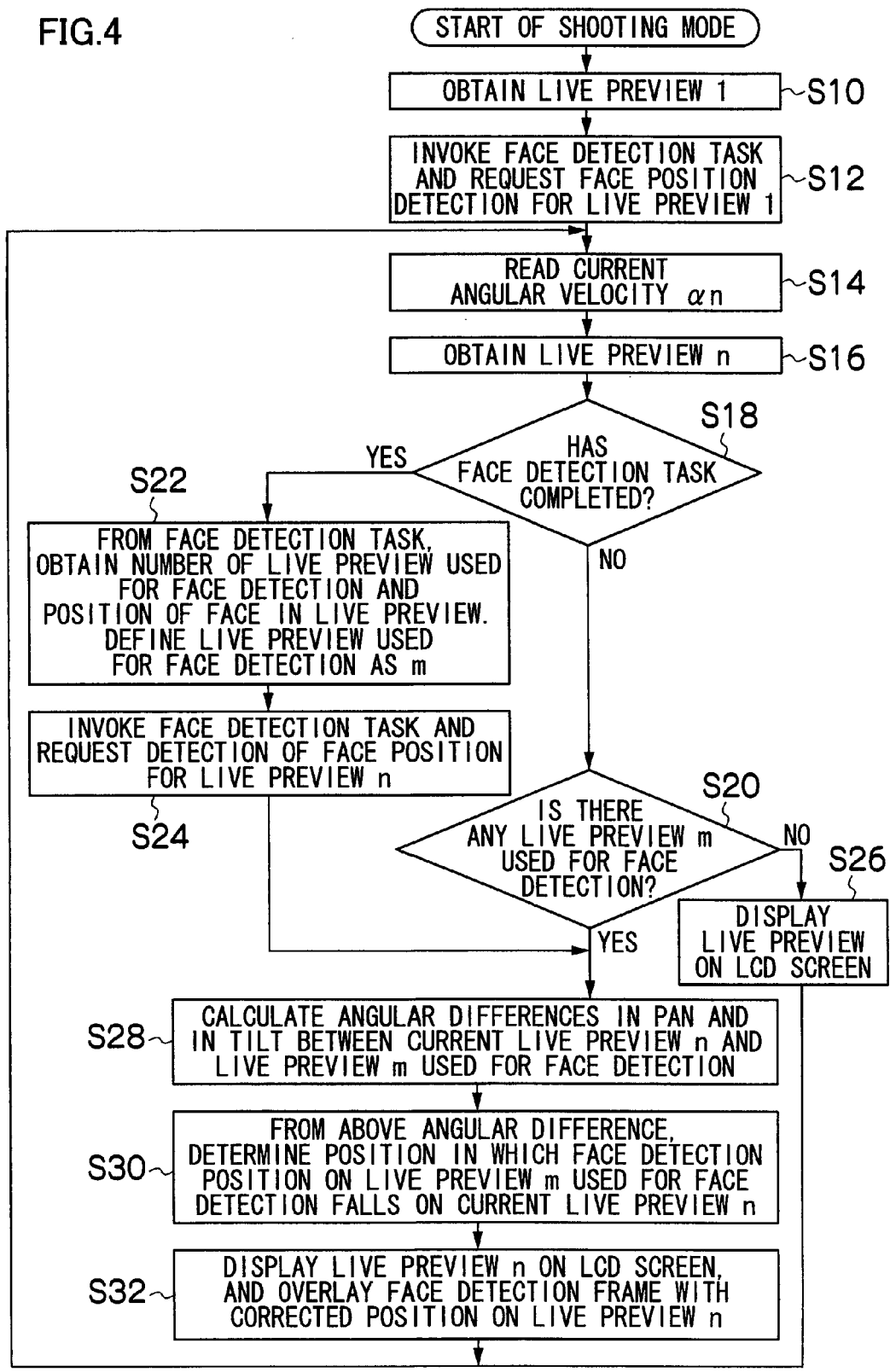
FIG. 4 is a flow chart describing the first embodiment of the method for displaying a face detection frame according to the present invention.

FIG. 4 is a flow chart describing the first embodiment of the method for displaying a face detection frame according to the present invention, in particular a method for displaying a live preview and a face detection frame in the shooting mode.

When the shooting mode is started, first, a live preview 1 (initial frame image) is obtained by means of an image-taking device including CCD 40 (step S10).

Then, a face detection task is invoked and requested to detect the position of a face image included in the live preview 1 (step S12).

Figure 5:
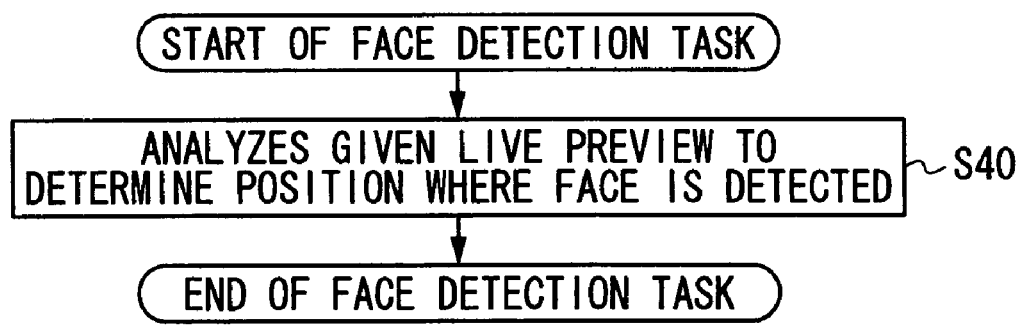
FIG. 5 is a flow chart illustrating a face detection task.

In response to this request, the face detection task starts separately. That is, the face detection task analyzes one given frame of the live preview to determine a position where a face is found in the live preview, as shown in FIG. 5 (step S40).

Turning back to FIG. 4, a current angular velocity $\alpha_n$ is obtained from the angular velocity sensor 70 and a current live preview n is obtained (step S14, S16).

Then, a determination is made as to whether the requested face detection task is completed or not (step S18), and if not, the process proceeds to step S20, and if it is completed, the process proceeds to step S22.

In step S22, the number of the live preview in which a face has been detected and the position of the face in the live preview are obtained from the face detection task, and the live preview used for the face detection is set to m. Then, the next face detection task is invoked and is requested to detect the position of a face in the live preview n obtained in step S16 (step S24).

In step S20, a determination is made as to whether or not there is a live preview m, which is obtained in step S22 as the live preview used for the face detection. If not, the live preview obtained in step S16 is displayed on the screen of the liquid crystal display monitor 15 (step S26). In this case, the face detection has not completed, and thus no face detection frame is displayed.

On the other hand, if there is a live preview m used for the face detection, a pan angular difference and a tilt angular difference between the current live preview n obtained in step S16 and the live preview m used for the face detection are determined (step S28). The angular difference βn is calculated from the sum of the products of a frame interval t and an angular velocity can from the live preview m to the live preview n as show as follows:

$$\beta n = \sum_{n}^{m+1} \alpha n \times t$$ [Expression 1]

Then, from the above described angular difference, a determination is made as to what position the face detection position on the live preview m used for the face detection falls in on the current live preview n, and the position of the face detection frame is corrected (step S30). Since the angular difference and the position on the image can be approximated to be in linear proportion, the amount of the correction of the position can be calculated by multiplying the angular difference by a constant factor. Note that if the taking lens 44 is a zoom lens, the focal length of the current taking lens is detected and the amount of the correction after the pan/tilt can be calculated based on the detected focal length and the angular difference.

Then in step S16, the obtained live preview n is displayed on the screen of the liquid crystal display monitor 15, and a face detection frame is also displayed on the corrected position on the live preview n (i.e., the position resulting from correcting the face position on the live preview m with the pan/tilt angular difference) determined in step S30 (step S32), and the process returns to step S14.

The above described processing in steps S14 to S32 is repeated at a predetermined frame rate (e.g. 1/60 second), and this results in displaying a live video preview on the liquid crystal display monitor 15.

Since it takes a longer time to process the face detection task than the above frame rate (e.g. 1 or 2 seconds), the current live preview displayed on the liquid crystal display monitor 15 and the live preview used for the face detection are for different times, however, the face detection frame can be displayed at the position of the face on the current live preview by correcting the display position of the face detection frame as described above, even if the digital camera 10 is panned/tilted.

Second Embodiment

Figure 6:
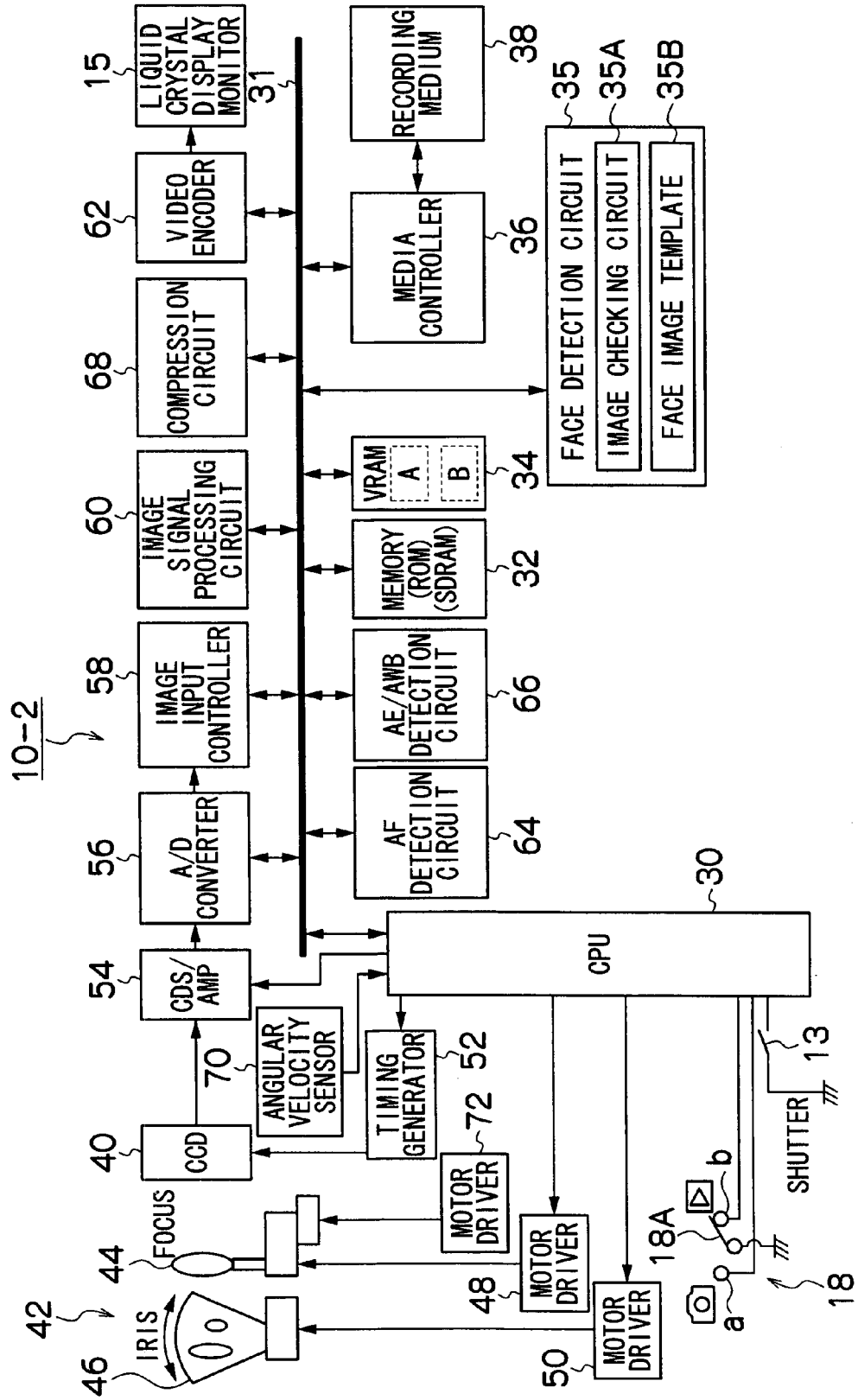
FIG. 6 is a block diagram illustrating an exemplary internal structure of a second embodiment of the image-taking device according to the present invention.

FIG. 6 is a block diagram illustrating an exemplary internal structure of a second embodiment of the image-taking device (digital camera 10-2) according to the present invention. Note that the same reference numerals are used to refer to the elements in common with the digital camera 10 in FIG. 2 and the detailed description thereof will be omitted.

The digital camera 10-2 of the second embodiment shown in FIG. 6 is different from the digital camera 10 of the first embodiment shown in FIG. 2 in that it has a camera shake compensation function.

More specifically, the digital camera 10-2 has a motor driver 72 used to cause (part of) the taking lens 40 to vibrate to the right and left or up and down. The CPU 30 detects a camera shake of the digital camera 10-2 based on an angular velocity signal of the angular velocity sensor 70, and controls the motor driver 72 to cancel the camera shake and optically prevent the camera shake from occurring.

Also, by optically isolating the vibration as described above, with respect to the angular difference detected from the detection output of the angular velocity sensor 70, the CPU 30 operates not to correct the display position of the face detection frame for the angular difference which can be optically isolated and to correct the display position of the face detection frame for the angular difference which cannot be optically isolated.

Figure 7:
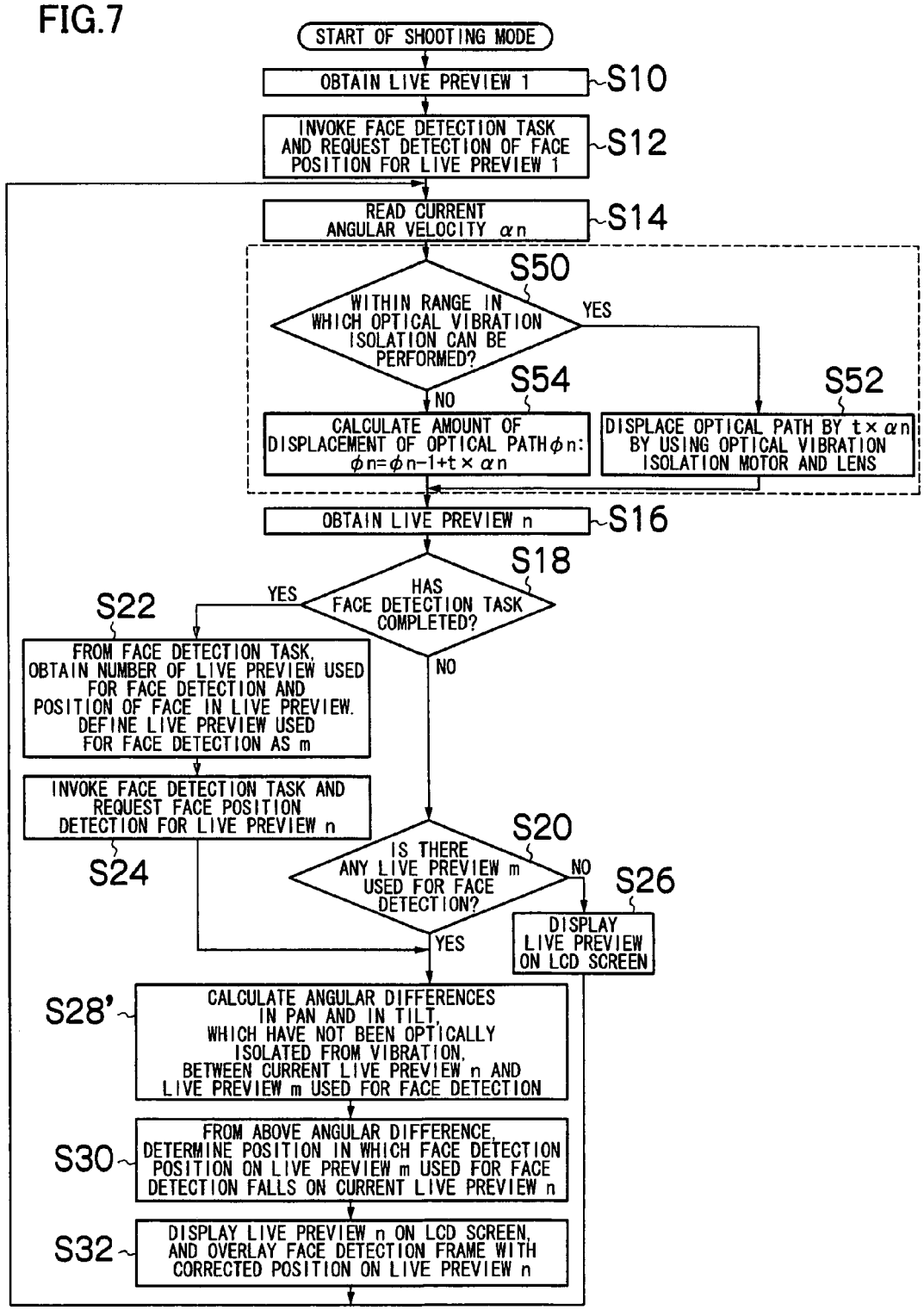
FIG. 7 is a flow chart describing the second embodiment of the method for displaying a face detection frame according to the present invention.

FIG. 7 is a flow chart describing a second embodiment of the method for displaying a face detection frame according to the present invention. Note that the same step numbers are given to the steps in common with those in the flow chart shown in FIG. 4 and the detailed description thereof will be omitted.

As shown in FIG. 7, in the second embodiment, additional operations in steps S50, S52 and S54 enclosed by a dashed line are added to the first embodiment. These steps are mainly for camera shake compensation processing. Also, step S28 is replaced by step S28'.

More specifically, a determination is made as to whether the angular velocity is within a range in which the optical vibration isolation can be performed, based on the current angular velocity an obtained from the angular velocity sensor 70 (step S50).

If it is within the range in which the optical vibration isolation can be performed, the lens is shaken to bend the optical path by $t \times \alpha_n$ to compensate the camera shake (step S52).

On the other hand, if the optical vibration isolation cannot be performed, the angle $t \times \alpha_n$ which has not been cancelled is added to the current angle $\phi_{n-1}$, and this added angle is defined as the pan/tilt angular difference $\phi_n$ as follows:

$$\phi_n = \phi_{n-1} + t \times \alpha_n \qquad \text{[Expression 2]}$$

In step S28', the difference between the pan/tilt angular difference $\phi_n$ of the current live preview n obtained in step S54 and the pan/tilt angular difference $\phi_m$ of the live preview m used for the face detection is calculated as follows:

$$\beta_n = \phi_n - \phi_m \qquad \text{[Expression 3]}$$

Then, from the above angular difference $\beta_n$, a position is determined in which the face detection position on the live preview m used for the face detection falls on the current live preview n, and the position of the face detection frame is corrected (step S30).

This allows the face detection frame 1 to be moved only if the angle of the digital camera 10-2 is displaced beyond the amount of the camera shake compensation (only when the live preview m is moved) in accordance with the amount of movement, instead of being moved immediately based on the output of the angular velocity sensor 70.

Third Embodiment

Figure 8:
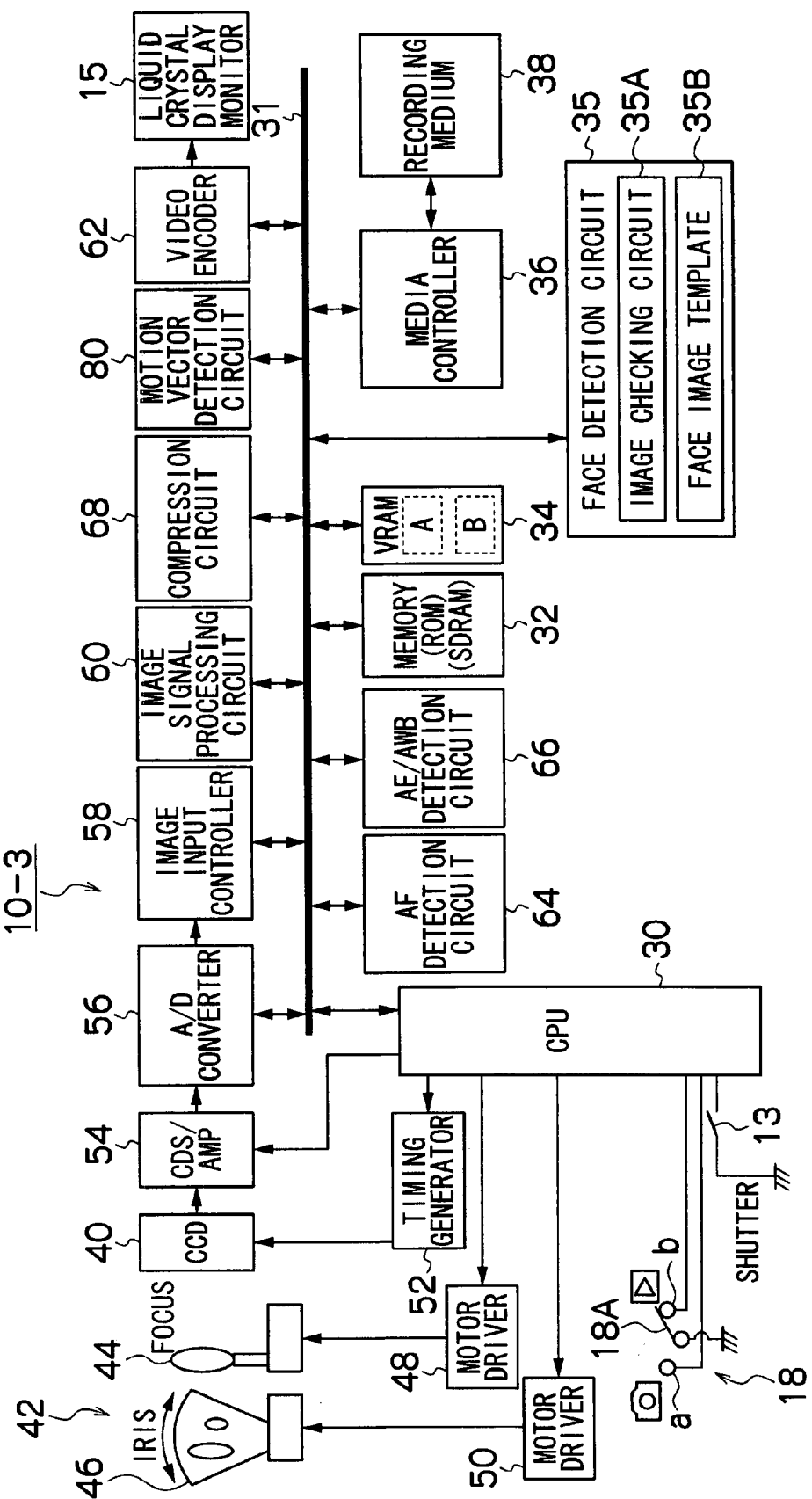
FIG. 8 is a block diagram illustrating an exemplary internal structure of a third embodiment of the image-taking device according to the present invention.

FIG. 8 is a block diagram illustrating an exemplary internal structure of a third embodiment of the image-taking device (digital camera 10-3) according to the present invention. Note that the same reference numerals are used to refer to the elements in common with the digital camera 10 in FIG. 2 and the detailed description thereof will be omitted.

The digital camera 10-3 of the third embodiment shown in FIG. 8 is different from the first embodiment mainly in that it has a motion vector detection circuit 80 which detects a motion vector of a subject instead of the angular velocity sensor 70 in the first embodiment.

The motion vector detection circuit 80 detects an amount of movement and a direction of movement (motion vector) on the screen between one image and the next image based on the live preview obtained continuously through the CCD 40, etc. This information indicating the motion vector is added to the CPU 30.

The CPU 30 determines the displacement of the image between a live preview used for the face detection and a current live preview based on the motion vector input from the motion vector detection circuit 80, and corrects the display position of a face detection frame in accordance with the displacement of the current live preview.

Figure 9:
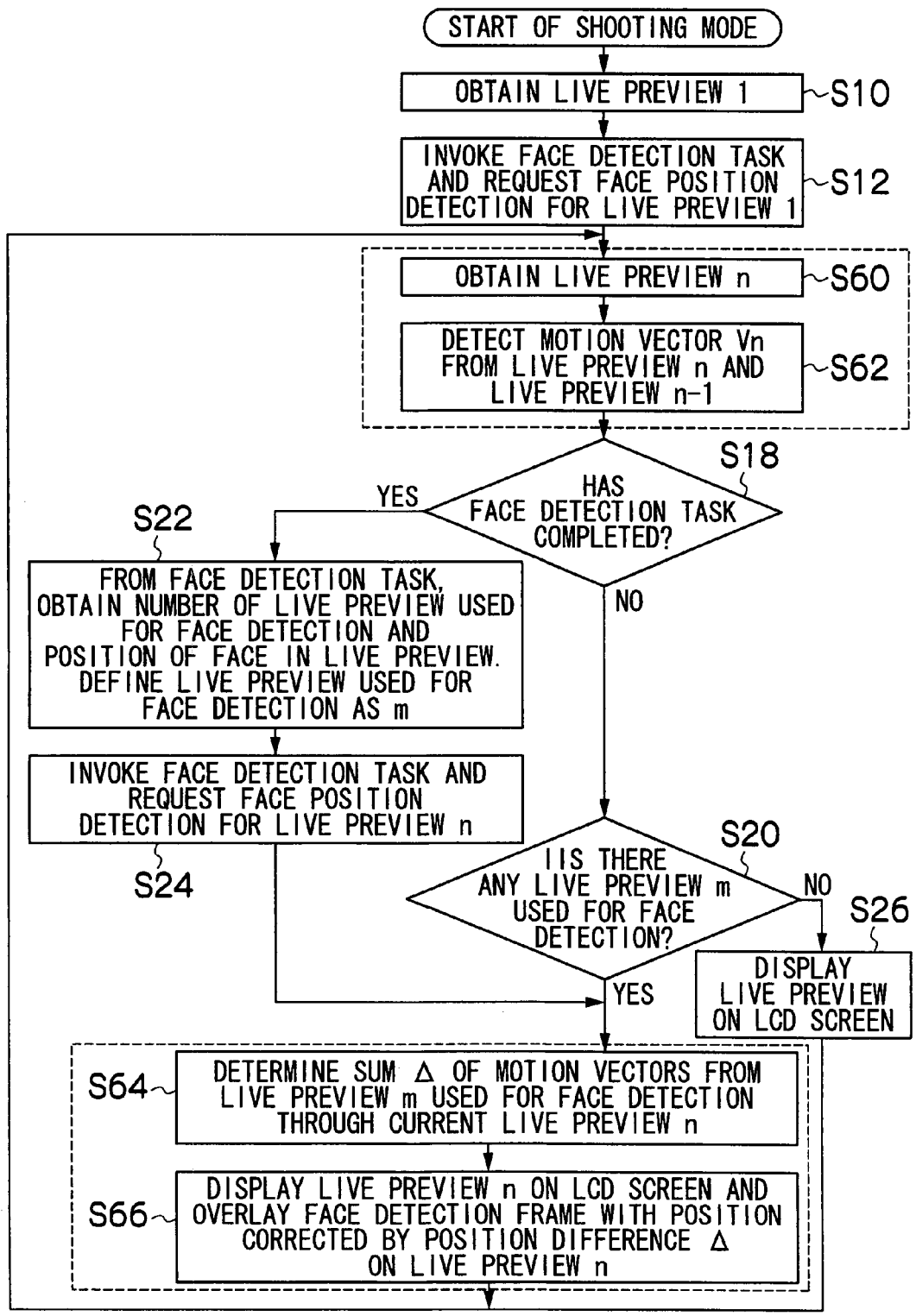
FIG. 9 is a flow chart describing the third embodiment of the method for displaying a face detection frame according to the present invention.

FIG. 9 is a flow chart describing a third embodiment of the method for displaying a face detection frame according to the present invention. Note that the same step numbers are given to the steps in common with those in the flow chart shown in FIG. 4 and the detailed description thereof will be omitted.

As shown in FIG. 9, the third embodiment differs from the first embodiment in operations in steps S60, S62 and in steps S64, S66, which are enclosed by a dashed line, respectively.

In steps S60, S62, a motion vector between two consecutive live previews is detected. More specifically, a current live preview n is obtained (step S60) and a motion vector $V_n$ is detected from the current live preview n and the previous live preview n−1 (step S62).

In step S64, the sum $\Delta$ of the motion vectors $V_n$ detected in step S62 from a live preview m used for the face detection through the current live preview n is calculated as follows:

$$\Delta = \sum_{n}^{m+1} Vn \times t \qquad \text{[Expression 4]}$$

This sum $\Delta$ gives the displacement (motion vector) of the current live preview n with respect to the live preview m used for the face detection on the screen. In step S66, the live preview n is displayed on the LCD screen, and the position of the face detection frame is corrected by the motion vector given by the sum $\Delta$ as determined above.

In this manner, the face detection frame can be moved such that it surrounds the face on the current live preview n even if the digital camera 10-3 is panned/tilted after obtaining the live preview m used for the face detection.

Next, the face detection task will be described in detail.

Figure 10A:
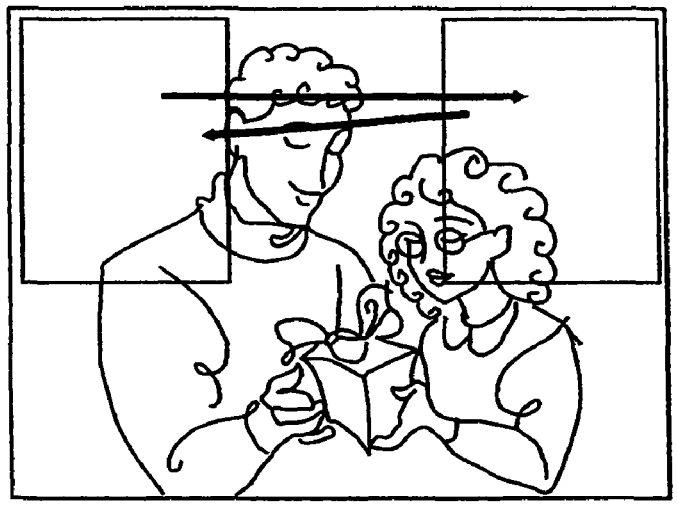
FIGS. 10A and 10B are illustrative pictures used to describe the outline of a face detection task.
Figure 10B:
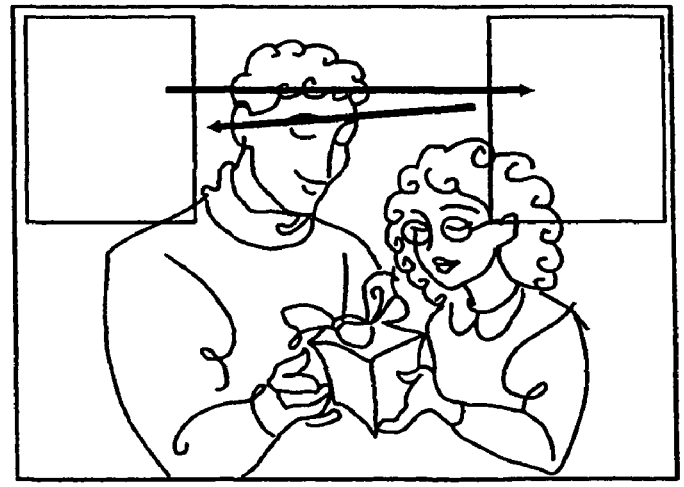

FIGS. 10A and 10B illustrate the outline of the face detection task. As shown in FIG. 10A, a maximum allowable target area, which is preset for detecting a face area, is shifted step by step within a screen to examine correlation with a face image template. Then, when the correlation score exceeds a threshold, the target area is identified as a face area.

Then, as shown in FIG. 10B, the target area is slightly narrowed, and the correlation with the face image template is examined again. This is repeated until the target area is reduced to the minimum desirable detection area.

Figure 11:
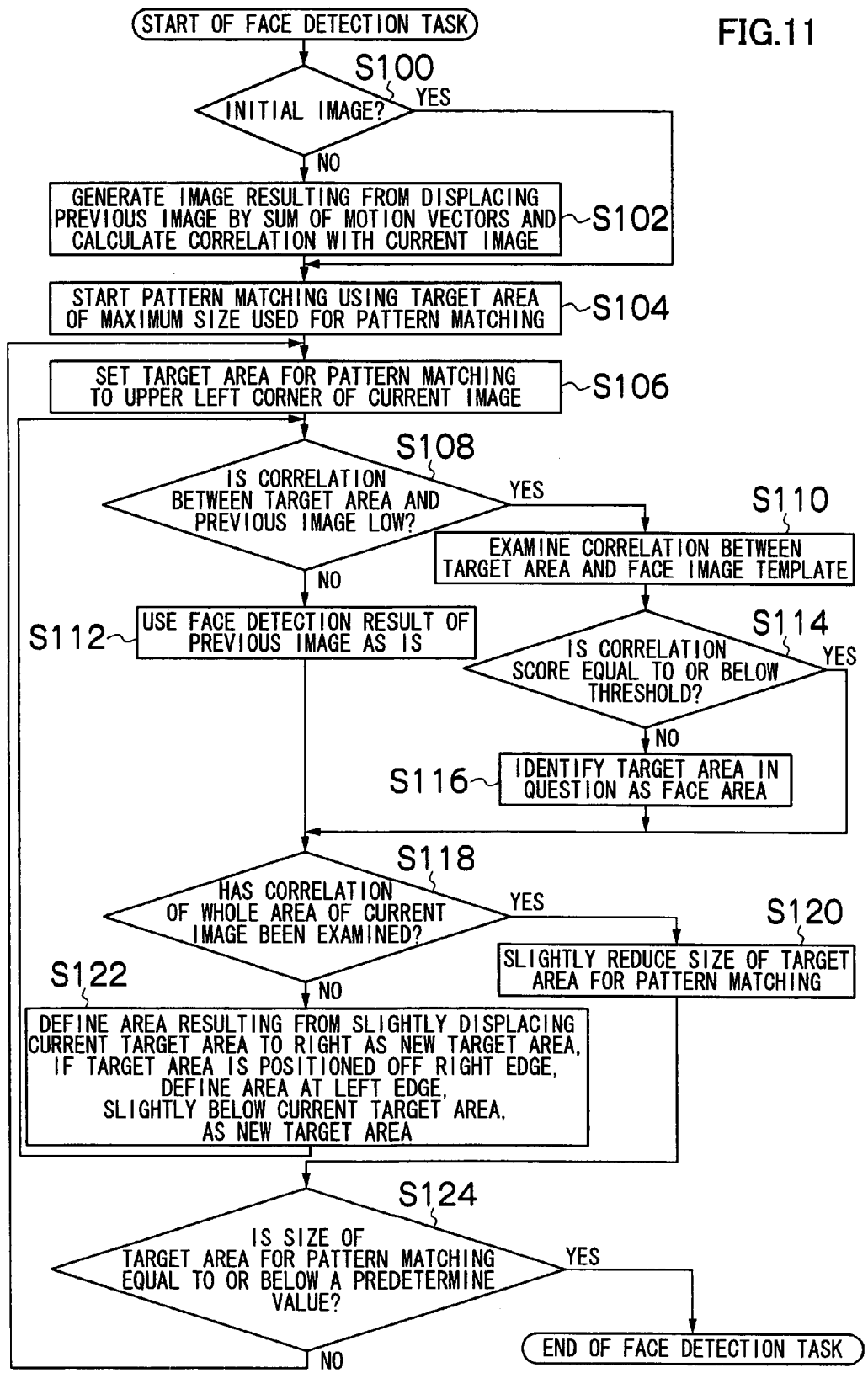
FIG. 11 is a flow chart describing the face detection task in detail.

FIG. 11 is a flow chart describing the face detection task in detail.

As shown in FIG. 11, a determination is made as to whether the image (live preview) is an initial image or not (step S100). If it is the initial image, the process proceeds to step S104, and if not, the process proceeds to step S102.

In step S102, an image resulting from displacing the previous image (live preview m−1) by the sum of the motion vectors from the previous image to the current image (live preview m) is generated and its correlation with the current image is calculated.

Then, a target area used for pattern matching is set to a maximum allowable size (step S104). The target area of the set size is positioned at the upper left corner (step S106). A determination is made as to whether the correlation between the image of the target area and the corresponding image of the previous image is low or not, and if the correlation is low, the process proceeds to step S110, and if not, the process proceeds to step S112.

In step S110, the correlation between the target area and the face image template is examined. A determination is made as to whether the correlation score is equal or below a threshold or no (step S114), and if YES, the process proceeds to step S118, if NO (if the correlation score is above the threshold), the target area is recognized as a face area (step S116), and then the process proceeds to step S118.

On the other hand, in step S112, since the correlation with the previous image is high (the image has not been moved), the face detection result of the previous image is used as is.

In step S118, a determination is made as to whether the correlation of the whole area of the current image has been examined or not, and if NO, an area resulting from displacing the current target area slightly to the right is defined as a new target area, if the target area is positioned at the right edge, an area at the left edge, slightly below the current target area, is defined as a new target area (step S122), and the target area is moved and then the process returns to step S108.

On the other hand, if YES, the target area for the pattern matching is slightly reduced (step S120). A determination is made as to whether the size of the reduced target area for pattern matching is equal or below a threshold (step S124), if YES, the face detection task ends, and if NO, the process returns to step S106.

In this manner, a face on the current image (live preview n) is detected.

Fourth Embodiment

Figure 12:
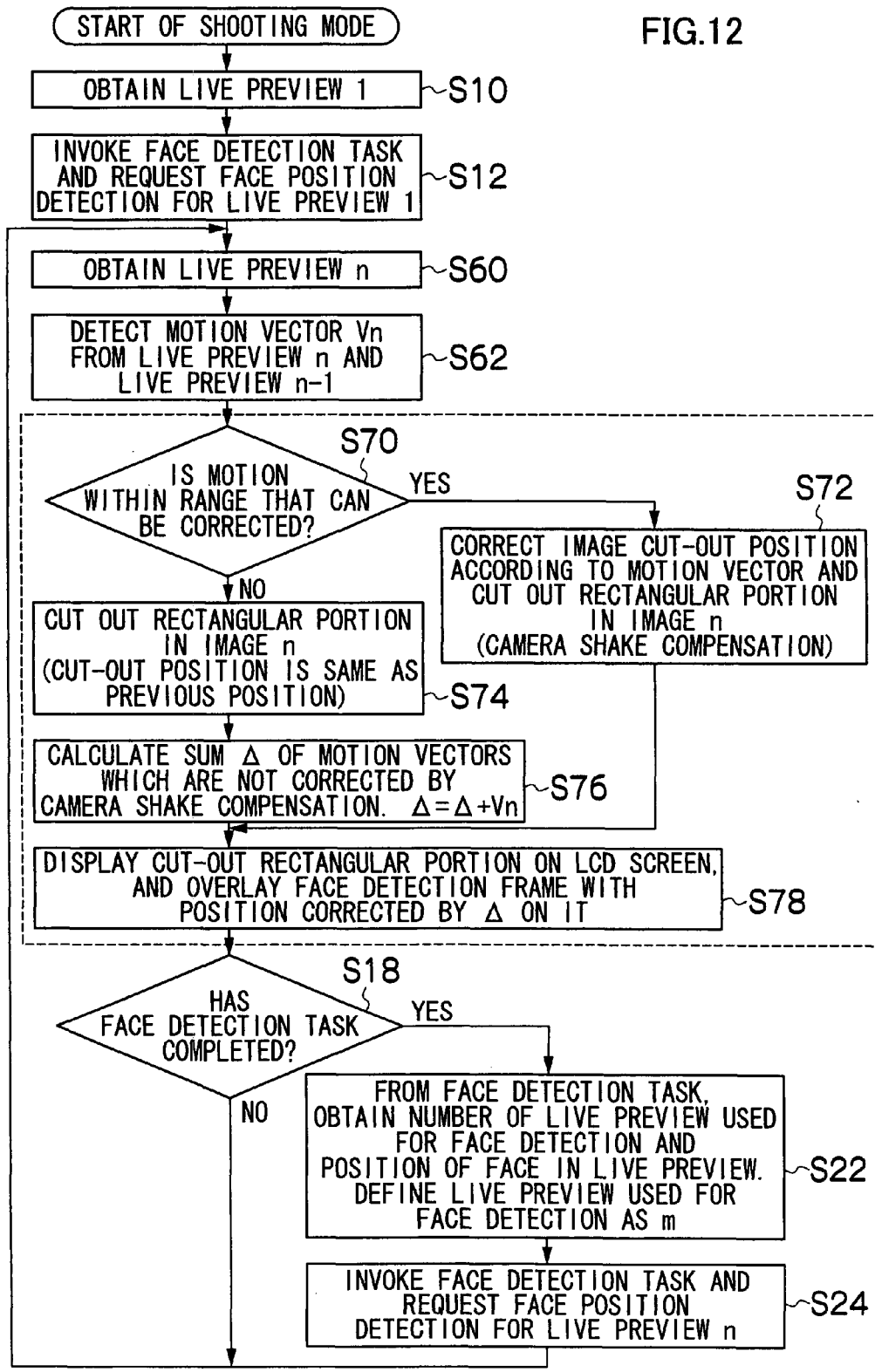
FIG. 12 is a flow chart describing a fourth embodiment of the method for displaying a face detection frame according to the present invention.

FIG. 12 is a flow chart describing a fourth embodiment of the method for displaying a face detection frame according to the present invention. Note that the same step numbers are given to the steps in common with those in the flow chart shown in FIG. 9 and the detailed description thereof will be omitted.

The fourth embodiment differs from the third embodiment in that an operation of camera shake compensation using a motion vector is added.

More specifically, in FIG. 12, in step S70 enclosed by a dashed line, a determination is made from a motion vector detected in step S62 as to whether the motion (camera shake) is within a range that can be corrected. If YES, the cut-out position of an image to be actually output as a live preview from the captured image n is corrected according to the motion vector, and the rectangular portion of the image within the image n is cut out (camera shake compensation processing).

On the other hand, if NO, an image of a rectangular portion at the same cut-out position as the previous position is cut out from the image n (step S74). Then, the sum Δ of the motion vectors which are not corrected by the camera shake compensation ($\Delta = \Delta + V_n$) is calculated (step S76).

Then, in step S78, the image of the cut-out rectangular portion is displayed on the LCD screen, and a face detection frame, the position of which has been corrected by the position difference Δ calculated in the previous step S76, is overlaid on the image for display (step S78).

In this manner, the face detection frame is adapted to be moved with respect to the motion vector beyond the range that can be corrected by the camera shake compensation, instead of being moved immediately based on the motion vector $V_n$.

Fifth Embodiment

Figure 13:
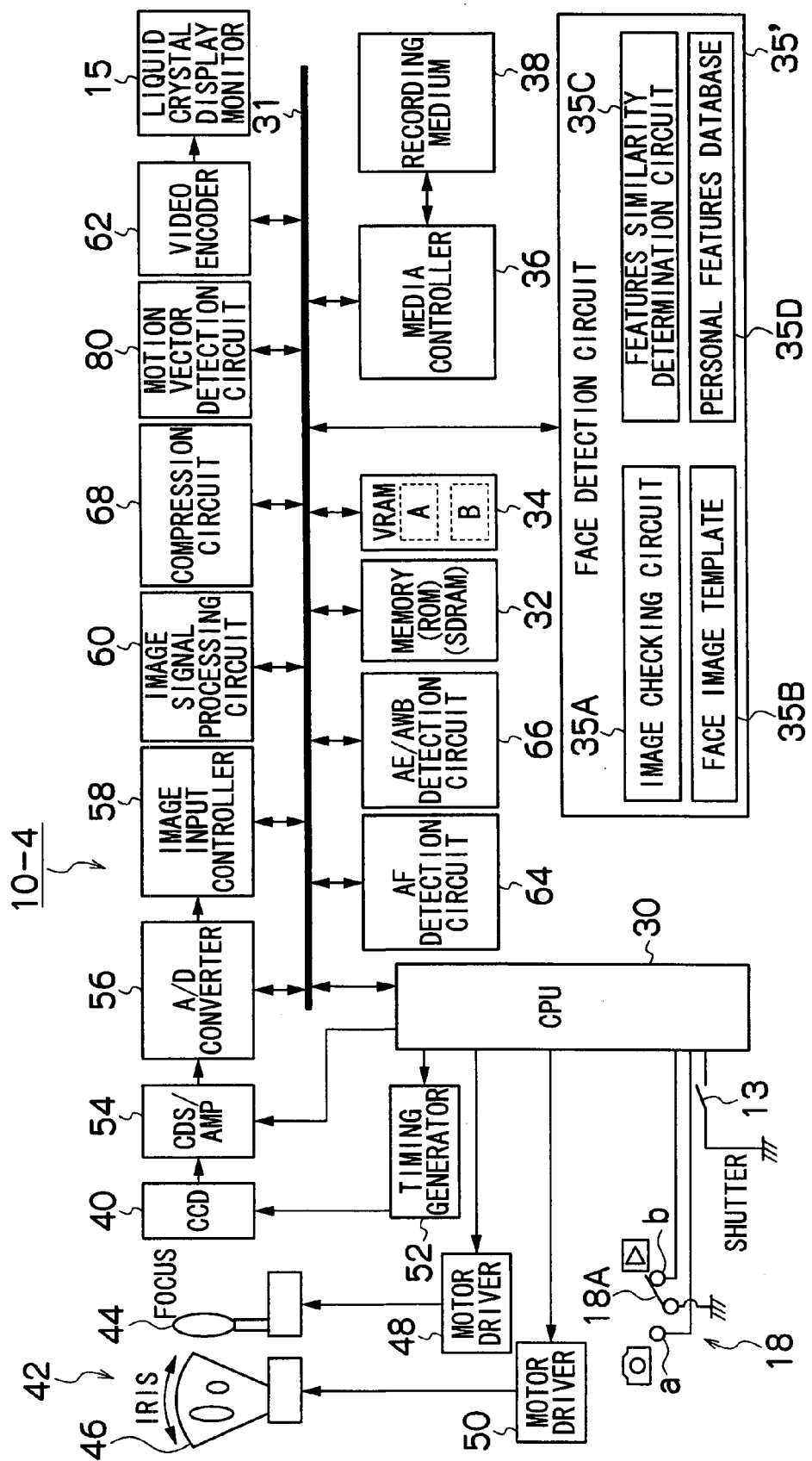
FIG. 13 is a block diagram illustrating an exemplary internal structure of a fifth embodiment of the image-taking device according to the present invention.

FIG. 13 is a block diagram illustrating an exemplary internal structure of a fifth embodiment of the image-taking device (digital camera 10-4) according to the present invention. Note that the same reference numerals are used to refer to the elements in common with the digital camera 10-3 shown in FIG. 8 and the detailed description thereof will be omitted.

The digital camera 10-4 of the fifth embodiment shown in FIG. 13 differs from the third embodiment in that it has a face detection circuit 35' instead of the face detection circuit 35 in the third embodiment.

The face detection circuit 35' is adapted to include a features similarity determination circuit 35C, and a personal features database 35D in addition to an image checking circuit 35A and a face image template 35B.

In the personal features database 35D, as shown in FIG. 14, names of particular persons and their associated face features A, B, C . . . are registered in advance.

The features similarity determination circuit 35C calculates the features A, B, C . . . of a face image detected from an image by the image checking circuit 35A and the face image template 35B, and determines whether features identical or similar to the features A, B, C . . . are registered in the personal features database 35D.

Figure 15:
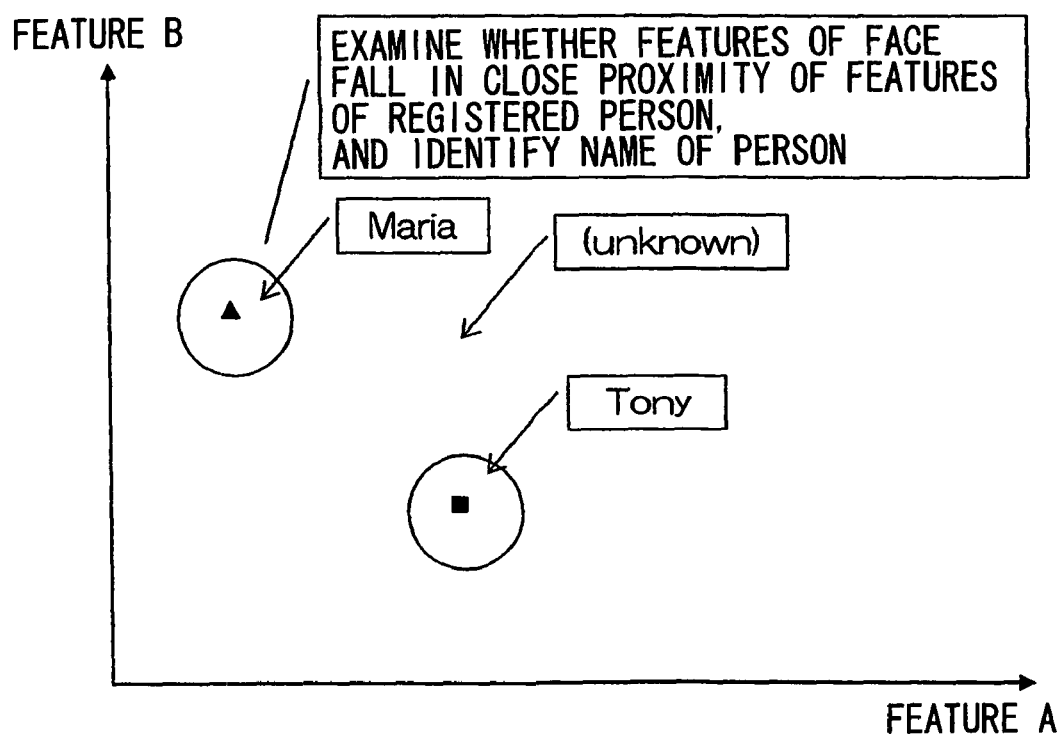
FIG. 15 is a diagram used to illustrate the operation of a features similarity determination circuit.

For example, as shown in FIG. 15, on a multidimensional graph having a plurality of features as parameters, features for a particular person "Tony" and another particular person "Maria," which are registered in advance, are represented by ■ and ▲, respectively. Features within the ranges of predetermined circles (or spheres) centered on these ■ and ▲ are respectively defined as the similarity ranges of the features for the particular persons "Tony" and "Maria."

The features similarity determination circuit 35C examines if the features A, B, C . . . of the detected face image fall within the similarity ranges of any of the features for the particular persons registered in the personal features database 35D, and identifies the name of the person.

The CPU 30, upon receipt of information indicating the position and size of a face area from the face detection circuit 35', superimposes a face detection frame surrounding the obtained face area of a person on a live preview for display on the liquid crystal display monitor 15, and also, if it obtains information indicating the name of a particular person identified based on the detected face image, a name label indicating the name of the particular person is superimposed on the live preview so as to correspond to the position of the person for display on the liquid crystal display monitor 15.

Figure 16A:
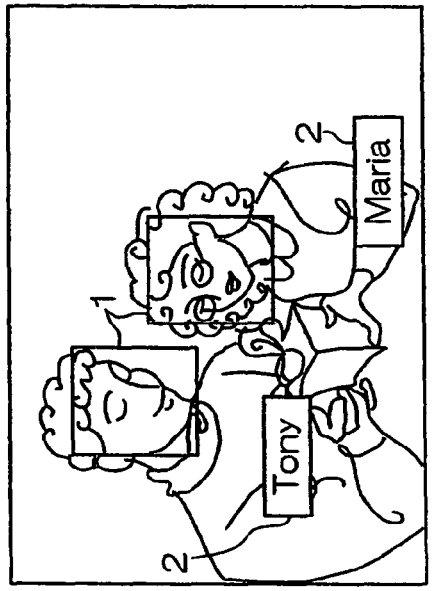
FIGS. 16A, 16B and 16C are pictures illustrating the outline of the fifth embodiment of the method for displaying a face detection frame according to the present invention.
Figure 16B:
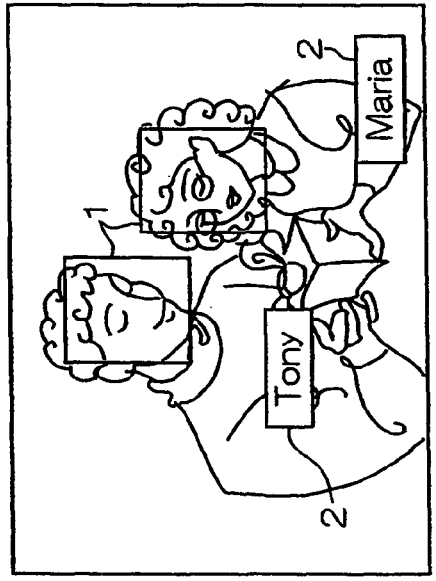
Figure 16C:
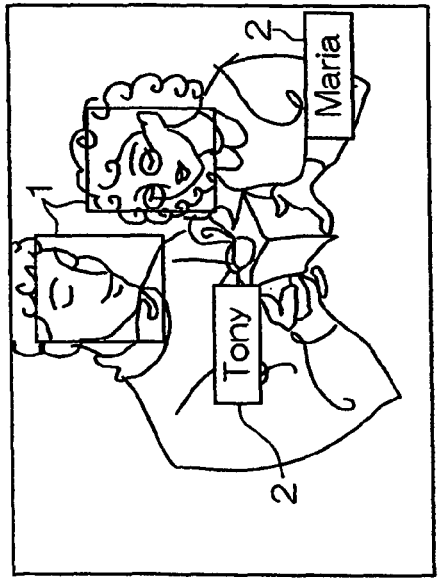

FIGS. 16A to 16C illustrate the outline of a fifth embodiment of the method for displaying a face detection frame according to the present invention.

FIG. 16A shows an original live preview at the time of face detection with face detection frames 1 and name labels 2 which are displayed when the camera is not moved.

Note that, as described above, the name labels 2 are displayed when detected faces within the face detection frames 1 are identified as the faces of particular persons previously registered, in such a manner that the names of the particular persons correspond to the positions of the persons.

If the camera is not moved from the time of the face detection as shown in FIG. 16A, since the live preview does not also move, the positions of the faces and the persons match the positions of the face detection frames 1, which are displayed so as to surround the detected faces at the time of the face detection, and the name labels 2, which are displayed so as to correspond to the persons.

On the other hand, if the camera is panned to the right during the time from one face detection to the next as shown in FIG. 16B, the live preview at the time of the face detection (original live preview) is moved to the left.

Likewise, if the camera is tilted downward during the time from one face detection to the next as shown in FIG. 16C, the original live preview moves upward.

In the fifth embodiment of the present invention, the amount of movement of a current live preview relative to an original live preview is detected, and face detection frames 1 and name labels 2 are moved in accordance with the amount of movement, thereby fixing the positions of faces and persons on the live preview with respect to the positions of the face detection frames 1 and the name labels 2.

Next, the face detection task in the fifth embodiment of the present invention will be described in detail with reference to a flow chart in FIG. 17. Note that the same step numbers are given to the steps in common with those in the flow chart of the face detection task shown in FIG. 11 and the detailed description thereof will be omitted.

Figure 17:
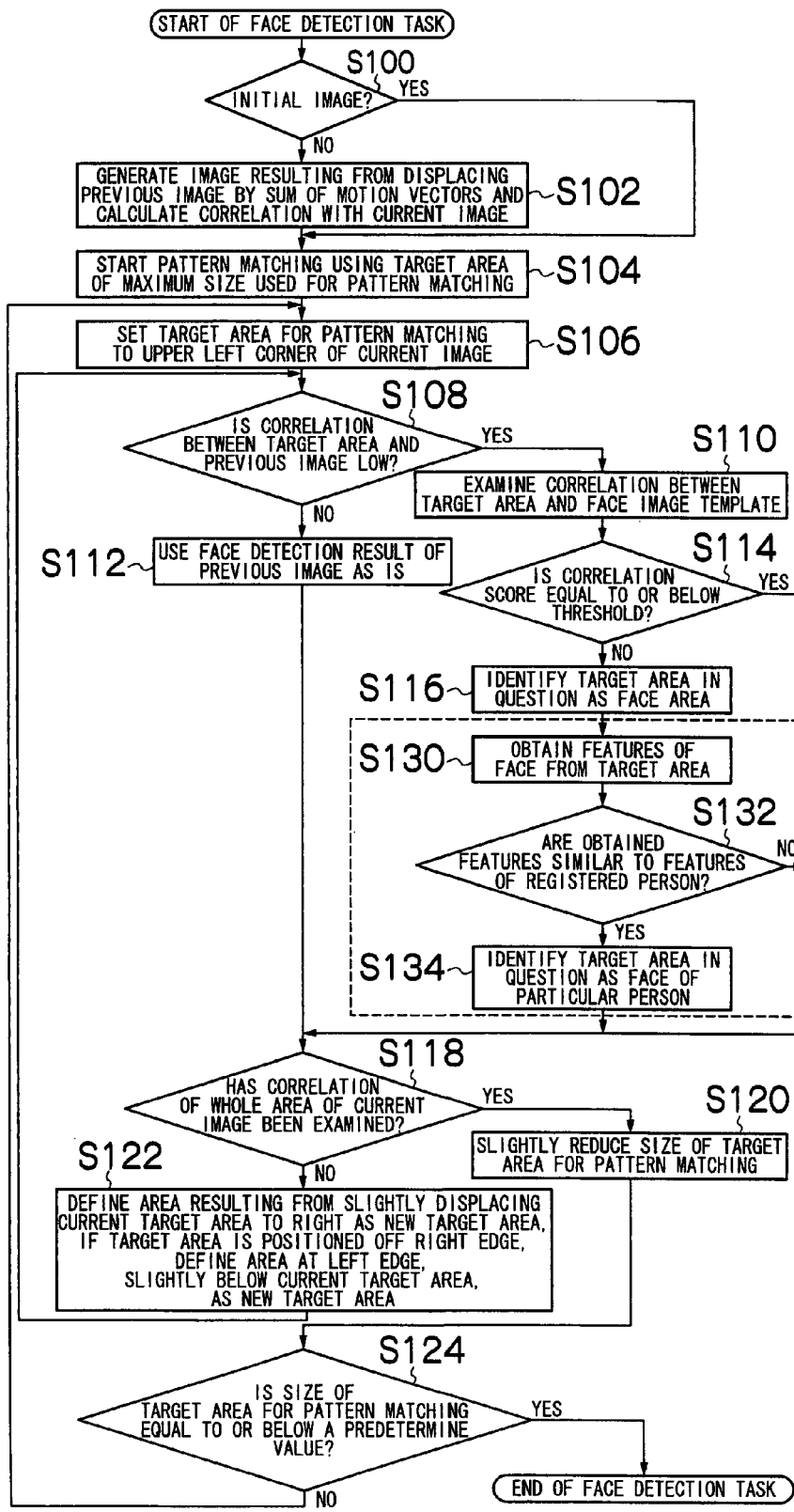
FIG. 17 is a flow chart describing the details of a face detection task in the fifth embodiment of the present invention.

As shown in FIG. 17, additional operations in steps S130, S132, and S134 enclosed by a dashed line are added to the face detection task shown in FIG. 11. These steps are mainly for recognition processing of a particular person from a detected face image.

More specifically, the features of a face are obtained from a target area which has been identified as a face area (step S130). Based on the obtained features, a determination is made as to whether or not the features are similar to the features of a particular person which have been registered in the personal features database 35D (step S132). If the features are not similar to any of the registered features, it is determined that no particular person can be identified, and the process proceeds to step S118, and if the features are similar to any of the registered features, the process proceeds to step S134.

In step S134, the image within the target area is identified as the face of the particular person having the similar features, and information about the name of the particular person is output to the CPU 30.

As with the fourth embodiment shown in FIG. 12, the digital camera 10-4 of the above fifth embodiment moves face detection frames and name labels based on the motion vector of a current live preview with respect to a live preview used for face detection (see FIGS. 16A to 16C).

Sixth Embodiment

Figure 18:
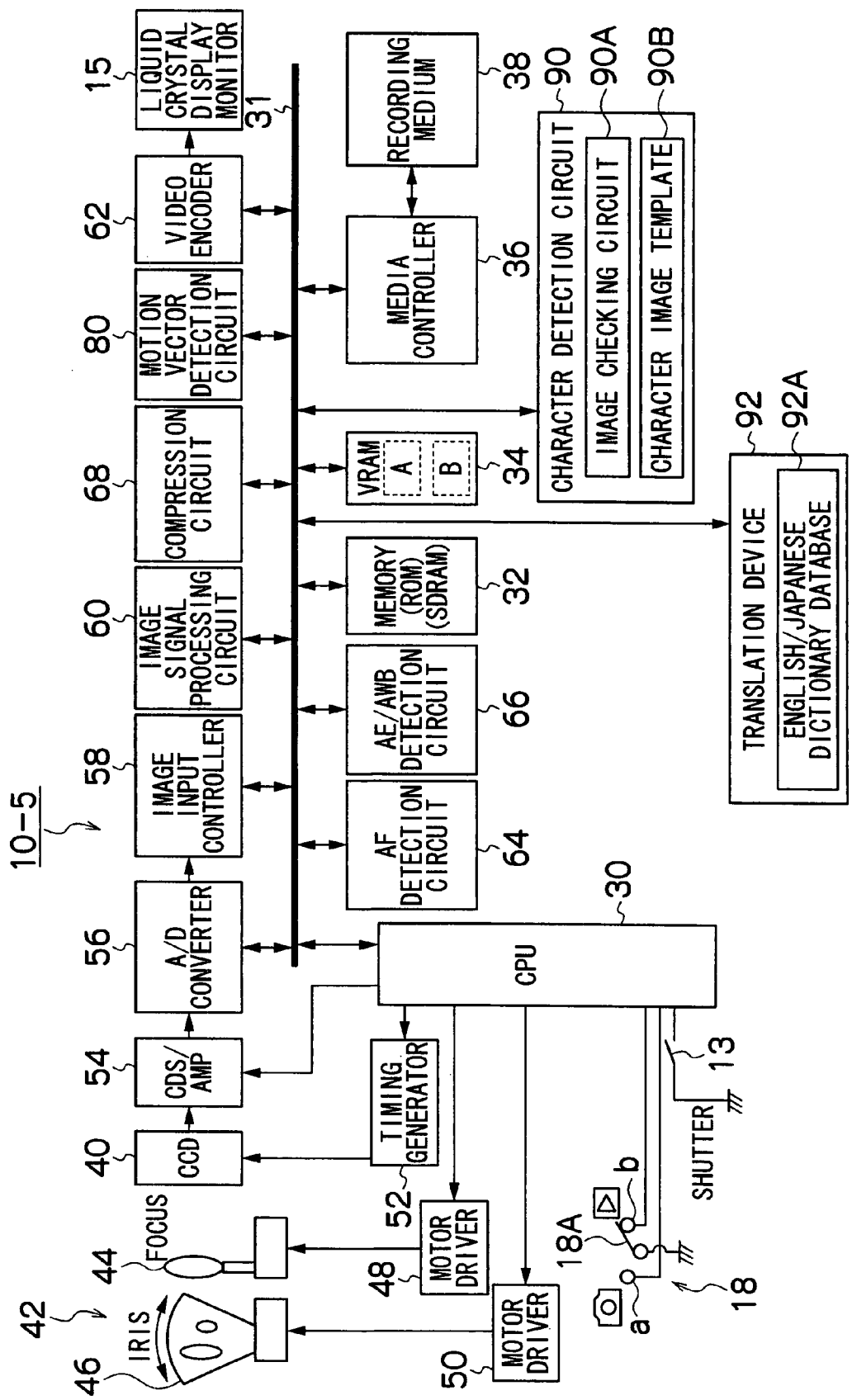
FIG. 18 is a block diagram illustrating an exemplary internal structure of a sixth embodiment of the image-taking device according to the present invention.

FIG. 18 is a block diagram illustrating an exemplary internal structure of a sixth embodiment of the image-taking device (digital camera 10-5) according to the present invention. Note that the same reference numerals are used to refer to the elements in common with the digital camera 10-3 in FIG. 8 and the detailed description thereof will be omitted.

The digital camera 10-5 of the sixth embodiment differs from the third embodiment mainly in that it has a character detection circuit 90 and a translation device 92 instead of the face detection circuit 35 in the third embodiment.

The character detection circuit 90, including an image checking circuit 90A and a character image template 90B, detects a character image included in a live preview and converts the character image into character information (text data). Then, it outputs positional information indicating the area of the character image and the character information to the CPU 30, and also outputs the character information to the translation device 92.

More specifically, the checking circuit 90A of the character detection circuit 90 checks an image within a target area against various types of character image templates to examine the correlation between them while shifting the position of the target area within the live preview. If the correlation score exceeds a predefined threshold, the target area is identified as a character area and character information corresponding to the checked character image template is obtained. Note that examples of the provided character image templates may include alphabet, hiragana, katakana, and kanji characters and various other characters.

The translation device 92 includes an English/Japanese dictionary database 92A, and if the character information input from the character detection circuit 90 is an alphabetical character string, the translation device 92 translates the input alphabetical character string using the English/Japanese dictionary database 92A into Japanese. Then, the translated character information is output to the CPU 30.

The CPU 30, upon obtaining the positional information of the character area from the character detection circuit 90, superimposes a character frame on the live preview in the vicinity of the obtained character area for display on the liquid crystal display monitor 15, and displays character fonts corresponding to the character information within the character frame. Note that, if there is any translation data for the character information translated in the translation device 92, the CPU 30 displays the character information corresponding to the translation.

Figure 19A:
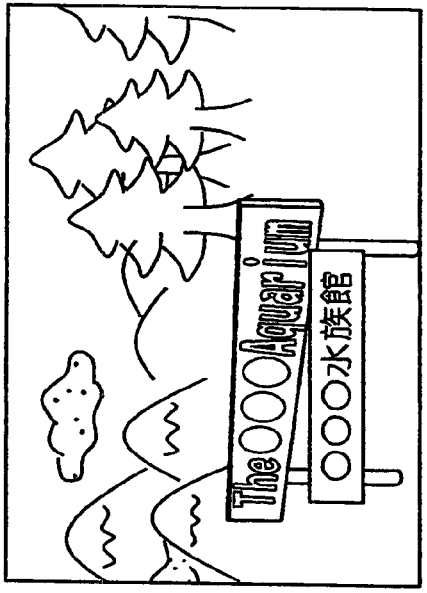
FIGS. 19A, 19B and 19C are pictures illustrating the outline of an embodiment of a method for displaying character information according to the present invention.
Figure 19B:
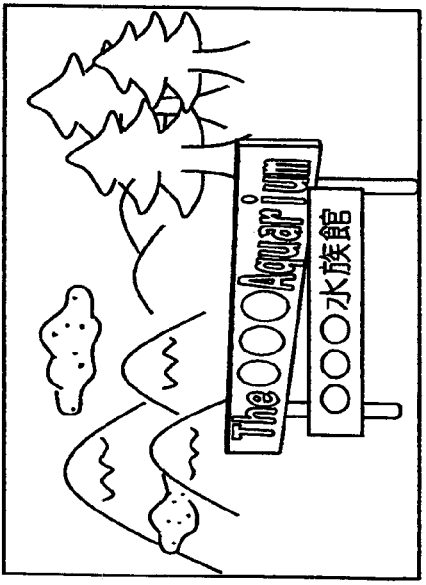
Figure 19C:
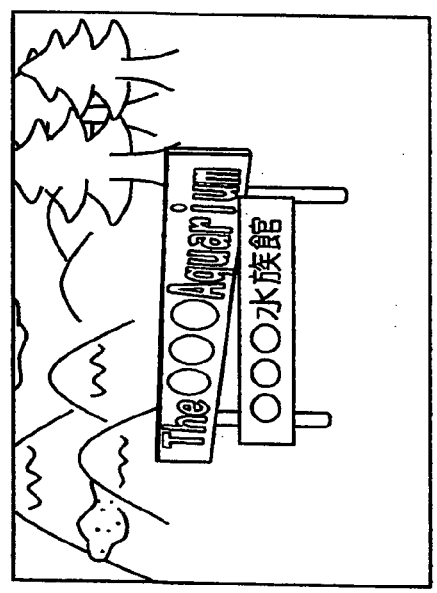

FIGS. 19A and 19B illustrate the outline of a method for displaying character information of an embodiment according to the present invention.

FIG. 19A shows an original live preview at the time of character detection with a character frame and character information which are displayed when the camera is not moved.

As shown in FIG. 19A, if the camera is not moved from the time of the character detection, since the live preview does not also move, the character information is displayed in the vicinity of the character image on the live preview. In this embodiment, the character information is adapted to be displayed below the detected character area.

On the other hand, as shown in FIG. 19B, if the camera is panned to the right during the time from one character detection to the next, the live preview at the time of the character detection (original live preview) is moved to the left.

Likewise, if the camera is tilted downward during the time from one character detection to the next, the original live preview is moved upward.

In the sixth embodiment of the present invention, the amount of movement of a current live preview with respect to an original live preview is detected, and character information is moved in accordance with that amount of movement, thereby displaying the character information corresponding to a character image to be displayed in the vicinity of the character image on the live preview even if the digital camera 10-5 is panned/tilted.

Figure 20:
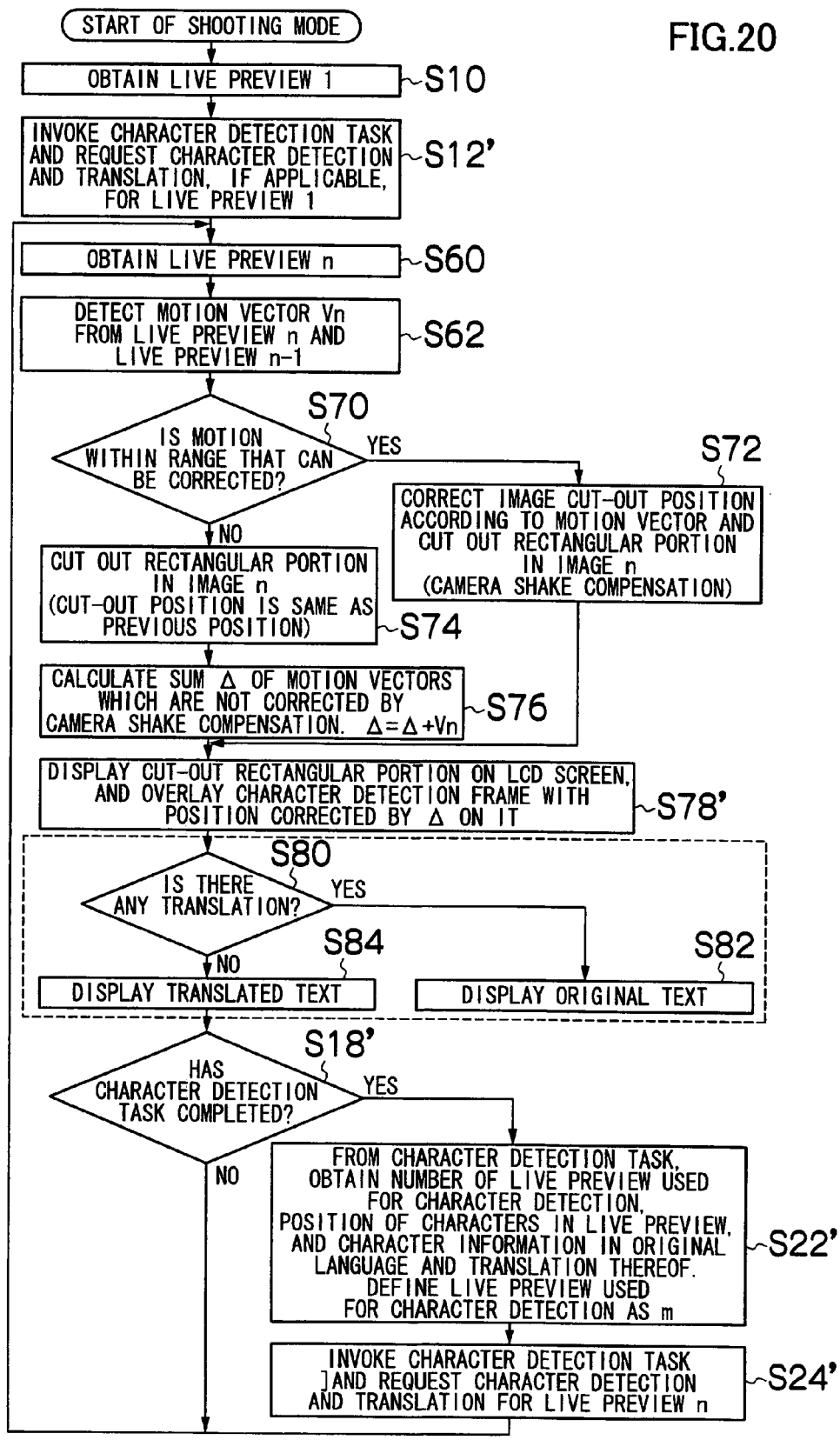
FIG. 20 is a flow chart describing the embodiment of the method for displaying character information according to the present invention.

FIG. 20 is a flow chart describing the embodiment of the method for displaying character information according to the present invention. Note that the same step numbers are given to the steps in common with those in the flow chart shown in FIG. 12 and the detailed description thereof will be omitted.

In contrast to the third embodiment shown in FIG. 12, which fixes the position of a face on a live preview relative to the position of a face detection frame, the embodiment shown in FIG. 20 detects a character image from a live preview and displays character information corresponding to the detected character image in such a manner that it is fixed in the vicinity of the character image even if the camera is panned/tilted.

More specifically, in step S12' of FIG. 20, a character detection task is invoked and is requested to detect characters included in a live preview 1 and to translate the characters. In step S78', the image of a cut-out rectangular portion of the live preview is displayed on a LCD screen, and a character frame and character information, the position of which has been corrected by the positional difference Δ calculated in the previous step S76, is displayed over the image.

In step S18', a determination is made as to whether the character detection by the character detection task has completed or not, and if YES, the process proceeds to step S22', where the number of the live preview in which characters have been detected and the position of the characters in the live preview are obtained from the character detection task, and the live preview used for the character detection is defined as m. Then, the next character detection task is invoked and is requested to detect characters from the live preview n obtained in step S16 and translate the characters (step S24').

Also, in the embodiment shown in FIG. 20, if there is any translated text in the character information obtained from the character detection task, the translated text is displayed instead of the original text.

More specifically, in step S80 of FIG. 20 enclosed by a dashed line, a determination is made as to whether the character information detected by the character detection task has a translated text or not. In this embodiment, if the detected character information is in English, a determination is made as to whether or not there is a translation in Japanese corresponding to the information in English.

If there is a translated text, the translation is displayed within a character frame superimposed on the live preview (step S82), and if not, the original text is displayed within the character frame superimposed on the live preview (step S84).

In the above embodiments, because the display positions of a face detection frame or character information can be corrected in accordance with the movement of a digital camera from the time of obtaining a live preview used for face detection or character detection, the position of a face image or a character image on the live preview can be fixed relative to the position of the face detection frame or the character information, even if the digital camera is panned/tilted. It should be noted, however, that the present invention is not limited to this, and that, when the digital camera is optically zoomed and the live preview is moved (scaled), a face detection frame or the like can also be moved or scaled in the same manner as above to match the face image and the face detection frame.

It should also be noted that, while in the above described embodiments a face detection frame or the like is displayed on a live preview which is displayed as a viewfinder image before a still picture is taken, that live preview is recorded as a moving picture in video shooting mode. It is preferred, however, that the face detection frame or the like is not recorded in the moving picture.

What is claimed is:

1. A method for displaying a face detection frame in an image-taking device, which obtains an image signal representing a subject continuously at a predetermined cycle, displays a live video preview on a display device based on the obtained image signal and detects a face of the subject included in the live preview based on the obtained image signal, and superimposes a face detection frame surrounding the detected face of the subject on the live preview for display on the display device, the method comprising the steps of:

detecting a movement of the image-taking device from the time of obtaining the image used for the face detection; and correcting a display position of the face detection frame according to the detected movement of the image-taking device on a basis of the display position of the face detection frame relative to the image used for the face detection until completion of a next cycle of face detection.

2. The method for displaying the face detection frame according to claim 1, wherein the movement of the image-taking device is detected based on a detection output of an angular velocity sensor which detects angular velocity of the image-taking device.

3. The method for displaying the face detection frame according to claim 2, further comprising the step of:

detecting a focal length of a taking lens when the image of the subject is picked up, and wherein the display position of the frame is corrected based on the detection output of the angular velocity sensor and the detected focal length.

4. The method for displaying the face detection frame according to claim 3, further comprising the step of:

compensating a camera shake of the image in accordance with the detected movement of the image-taking device, and wherein the display position of the face detection frame is corrected in accordance with the movement of the image-taking device which cannot be corrected by the camera shake compensation.

5. The method for displaying the face detection frame according to claim 4, further comprising the steps of:

identifying a person from features of the face of the subject included in the live preview based on the obtained image signal; and superimposing the name of the identified person on the live preview so as to correspond to the position of the person for display, and wherein the display position of the person's name is corrected in accordance with the movement of the detected image-taking device.

6. The method for displaying the face detection frame according to claim 2, further comprising the step of:

compensating a camera shake of the image in accordance with the detected movement of the image-taking device, and wherein the display position of the face detection frame is corrected in accordance with the movement of the image-taking device which cannot be corrected by the camera shake compensation.

7. The method for displaying the face detection frame according to claim 1, wherein the movement of the image-taking device is detected by detecting a motion vector of the image based on the image signal continuously obtained from the image-taking device.

8. The method for displaying the face detection frame according to claim 7, further comprising the step of:

compensating a camera shake of the image in accordance with the detected movement of the image-taking device, and wherein the display position of the face detection frame is corrected in accordance with the movement of the image-taking device which cannot be corrected by the camera shake compensation.

9. The method for displaying the face detection frame according to claim 1, further comprising the step of:
- compensating a camera shake of the image in accordance with the detected movement of the image-taking device, and
- wherein the display position of the face detection frame is corrected in accordance with the movement of the image-taking device which cannot be corrected by the camera shake compensation.

10. The method for displaying the face detection frame according to claim 1, further comprising the steps of:
- identifying a person from features of the face of the subject included in the live preview based on the obtained image signal; and
- superimposing the name of the identified person on the live preview so as to correspond to the position of the person for display, and
- wherein the display position of the person's name is corrected in accordance with the movement of the detected image-taking device.

11. An image-taking device, comprising:
- an image pickup device which picks up an image of a subject;
- an image obtaining device which obtains an image signal representing the subject through the image pickup device continuously at a predetermined cycle;
- a display device which displays a live video preview based on the obtained image signal;
- a face detection device which detects a face of the subject included in the live preview based on the obtained image signal, wherein the face detection device takes a longer time from the input of the image signal for face detection to the completion of the face detection than the cycle of the continuously obtained image signal;
- a face detection frame display control device which superimposes a face detection frame surrounding the detected face of the subject on the live preview for display;
- a movement detection device which detects a movement of the image-taking device; and
- a frame display position correction device which corrects a display position of the face detection frame displayed on the display device based on a detection output of the movement detection device until the face detection device completes the next face detection.

12. The image-taking device according to claim 11, wherein the movement detection device includes an angular velocity sensor which detects angular velocity of the image-taking device.

13. The image-taking device according to claim 12 further comprising:
- a detection device which detects a focal length of a taking lens when the image of the subject is picked up,
- wherein the frame display position correction device corrects the display position of the face detection frame displayed on the display device based on the detection output of the angular velocity sensor and the detected focal length.

14. The image-taking device according to claim 13, further comprising:
- a camera shake compensation device which detects camera shake and corrects the blur of the image based on the detection output of the movement detection device,
- wherein the frame display position correction device detects a pan/tilt angle after the camera shake compensation based on the detection output of the movement detection device, and corrects the display position of the face detection frame displayed on the display device based on the pan/tilt angle.

15. The image-taking device according to claim 14, further comprising:
- a person identification device which identifies a person from features of the face of the subject included in the live preview based on the obtained image signal;
- a name display control device which superimposes the name of the identified person on the live preview so as to correspond to the position of the person for display; and
- a name display position correction device which corrects the display position of the name of the person displayed on the display device based on the detection output of the movement detection device until the person identification device completes the next person identification.

16. The image-taking device according to claim 12, further comprising:
- a camera shake compensation device which detects camera shake and corrects the blur of the image based on the detection output of the movement detection device,
- wherein the frame display position correction device detects a pan/tilt angle after the camera shake compensation based on the detection output of the movement detection device, and corrects the display position of the face detection frame displayed on the display device based on the pan/tilt angle.

17. The image-taking device according to claim 11, wherein the movement detection device is a motion vector detection device which detects a motion vector of the image based on the continuously obtained image signal.

18. The image-taking device according to claim 17, further comprising:
- a camera shake compensation device which detects camera shake and corrects the blur of the image based on the detection output of the movement detection device,
- wherein the frame display position correction device detects a pan/tilt angle after the camera shake compensation based on the detection output of the movement detection device, and corrects the display position of the face detection frame displayed on the display device based on the pan/tilt angle.

19. The image-taking device according to claim 11, further comprising:
- a camera shake compensation device which detects camera shake and corrects the blur of the image based on the detection output of the movement detection device,
- wherein the frame display position correction device detects a pan/tilt angle after the camera shake compensation based on the detection output of the movement detection device, and corrects the display position of the face detection frame displayed on the display device based on the pan/tilt angle.

20. The image-taking device according to claim 11, further comprising:
- a person identification device which identifies a person from features of the face of the subject included in the live preview based on the obtained image signal;
- a name display control device which superimposes the name of the identified person on the live preview so as to correspond to the position of the person for display; and
- a name display position correction device which corrects the display position of the name of the person displayed on the display device based on the detection output of the movement detection device until the person identification device completes the next person identification.

* * * * *